(12) United States Patent
Wang et al.

(10) Patent No.: US 12,363,555 B2
(45) Date of Patent: Jul. 15, 2025

(54) METHOD PERFORMED BY USER EQUIPMENT AND USER EQUIPMENT IN WIRELESS COMMUNICATION SYSTEM

(71) Applicant: Samsung Electronics Co., Ltd., Suwon-si (KR)

(72) Inventors: He Wang, Beijing (CN); Haijie Qiu, Beijing (CN); Yankun Li, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 17/652,775

(22) Filed: Feb. 28, 2022

(65) Prior Publication Data

US 2022/0330039 A1 Oct. 13, 2022

(30) Foreign Application Priority Data

Mar. 31, 2021 (CN) .......................... 202110348843.0

(51) Int. Cl.
*H04W 16/28* (2009.01)
*H04W 8/22* (2009.01)
*H04W 24/10* (2009.01)
*H04W 72/044* (2023.01)

(52) U.S. Cl.
CPC .............. *H04W 16/28* (2013.01); *H04W 8/22* (2013.01); *H04W 24/10* (2013.01); *H04W 72/0473* (2013.01)

(58) Field of Classification Search
CPC ....... H04W 16/28; H04W 8/22; H04W 24/10; H04W 8/24; H04W 72/046; H04W 72/0473
See application file for complete search history.

(56) References Cited

U.S. PATENT DOCUMENTS 10,009,908 B2    6/2018  Palenius et al.
2018/0091373 A1*  3/2018  Manolakos ......... H04L 41/0896
2018/0213595 A1*  7/2018  Lee ..................... H01Q 1/3216
(Continued)

FOREIGN PATENT DOCUMENTS

EP    3965464 A1 *  3/2022  ............. H04L 5/001
EP    3986014 A1     4/2022
WO  2020250433 A1   12/2020

OTHER PUBLICATIONS

Huawei et al., "Preliminary discussion on NR support for high speed train scenario in FR2", 3GPP TSG-RAN WG4 Meeting # 98-e, R4-2101708, Electronic Meeting, Jan. 25-Feb. 5, 2021 (Year: 2021).*

(Continued)

*Primary Examiner* — Shah M Rahman

(57) ABSTRACT

The present disclosure relates to a pre-5$^{th}$-generation (5G) or 5G communication system to be provided for supporting higher data rates beyond 4$^{th}$-generation (4G) communication system such as long term evolution (LTE). The present disclosure provides a method performed by a user equipment in a wireless communication system, and the user equipment. The method comprises: transmitting information indicating a high speed capability of the UE to a network-side entity; and receiving configuration information corresponding to the high speed capability of the UE from the network-side entity.

20 Claims, 7 Drawing Sheets

(56) References Cited

U.S. PATENT DOCUMENTS

| | | | |
|---|---|---|---|
| 2020/0236605 A1 | 7/2020 | Yiu | |
| 2020/0322812 A1* | 10/2020 | Shi | H04W 16/28 |
| 2020/0374079 A1* | 11/2020 | Chervyakov | H04L 27/2657 |
| 2021/0306864 A1* | 9/2021 | Park | H04B 7/0617 |
| 2021/0392536 A1* | 12/2021 | Fujimura | H04W 36/0088 |
| 2022/0191709 A1* | 6/2022 | Zhou | H04B 7/0695 |
| 2022/0240110 A1* | 7/2022 | Li | H04W 24/10 |
| 2022/0322122 A1* | 10/2022 | Fujimura | H04W 24/10 |
| 2022/0338074 A1* | 10/2022 | Hu | H04W 36/0058 |
| 2023/0116740 A1* | 4/2023 | Niu | H04W 36/322 370/331 |
| 2024/0072877 A1* | 2/2024 | Callender | H04B 7/088 |

OTHER PUBLICATIONS

Nokia et al., "On high-speed train deployment scenario in FR2", 3GPP TSG-RAN WG4 Meeting # 98-e, R4-2102099, Electronic Meeting, Jan. 25-Feb. 5, 2021 (Year: 2021).*

Ericsson, "Consideration on UE requirements for FR2 HST", 3GPP TSG-RAN WG4 Meeting # 98-e, R4-21026799, Electronic Meeting, Jan. 25-Feb. 5, 2021 (Year: 2021).*

Samsung, "WF on UE RF requirement for FR2 HST", 3GPP TSG-RAN WG4 Meeting # 100-e, R4-2114976, Electronic Meeting, Aug. 16-27, 2021, 6 pages.

Nokia et al., "WF on FR2 HST RRM (part 1)", 3GPP TSG-RAN WG4 Meeting # 100-e, R4-2115334, Electronic Meeting, Aug. 16-27, 2021, 6 pages.

Samsung, "WF for FR2 HST RRM (part 2)", 3GPP TSG-RAN WG4 Meeting # 100-e, R4-2115335, Electronic Meeting, Aug. 16-27, 2021, 2 pages.

International Search Report and Written Opinion of the International Searching Authority in connection with International Application No. PCT/KR2022/001771 issued May 11, 2022, 7 pages.

Nokia et al., "Power Class 4 for HST", R4-2015087, 3GPP TSG-WG RAN4 Meeting #97-e, Online, Nov. 2020, 2 pages.

Moderator (Samsung), "Email discussion summary for [97e][138] NR_HST_FR2_enh", R4-2016640, 3GPP TSG-RAN WG4 Meeting # 97-e, Electronic Meeting, Nov. 2020, 40 pages.

Samsung et al., "Revised WID on NR support for high speed train scenario in frequency range 2 (FR2)", RP-202538, 3GPP TSG-RAN Meeting #90-e, Electronic Meeting, Dec. 2020, 5 pages.

Supplementary European Search Report dated Jul. 23, 2024, in connection with European Patent Application No. 22781373.0, 14 pages.

Samsung, "NR support for high speed train scenario in frequency range 2 (FR2)," 3GPP TSG RAN Meeting #91e RP-210295, Electronic Meeting, Mar. 2021, 10 pages.

Nokia et a l., "Power Class 4 for HST," 3GPP TSG-WG RAN4 Meeting #98-e R4-2102561, Online, Jan. 25-Feb. 5, 2021, 3 pages.

* cited by examiner

METHOD PERFORMED BY USER EQUIPMENT AND USER EQUIPMENT IN WIRELESS COMMUNICATION SYSTEM

CROSS-REFERENCE TO RELATED APPLICATION

This application claims priority under 35 U.S.C. § 119(a) to Chinese Patent Application Serial No. 202110348843.0, which was filed in the Chinese Patent Office on Mar. 31, 2021, the entire disclosure of which is incorporated herein by reference.

BACKGROUND

1. Field

The application relates to a technical field of wireless communication, more specifically, to a method performed by a user equipment and a user equipment in wireless communication system.

2. Description of Related Art

To meet the demand for wireless data traffic having increased since deployment of 4G (4th-Generation) communication systems, efforts have been made to develop an improved 5G (5th-Generation) or pre-5G communication system. Therefore, the 5G or pre-5G communication system is also called a 'beyond 4G network' or a 'post LTE system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

According to an aspect of the present disclosure, there is provided a method performed by a user equipment (UE) in a wireless communication system, including: transmitting UE capability information to a network-side entity; and receiving configuration information determined based on the UE capability information from the network-side entity.

According to another aspect of the present disclosure, there is provided a method performed by a network-side entity in a wireless communication system, including: receiving information indicating high speed mobility related capability of a user equipment (UE) from the UE; and transmitting configuration information corresponding to the high speed mobility related capability of the UE to the UE.

According to another aspect of the present disclosure, there is provided a UE in a wireless communication system, including: a transceiver configured to transmit and receive signals; and a processor configured to control the transceiver to transmit UE capability information to a network-side entity; and control the transceiver to receive configuration information determined based on the UE capability information from the network-side entity.

According to another aspect of the present disclosure, there is provided a network-side entity in a wireless communication system, including: a transceiver configured to transmit and receive signals; and a processor configured to control the transceiver to receive information indicating high speed mobility related capability of a user equipment (UE) from the UE; and control the transceiver to transmit configuration information corresponding to the high speed mobility related capability of the UE to the UE.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain embodiments of the present disclosure will become more apparent from the following description taken in conjunction with the accompanying drawings, in which.

DETAILED DESCRIPTION

Figure 1:
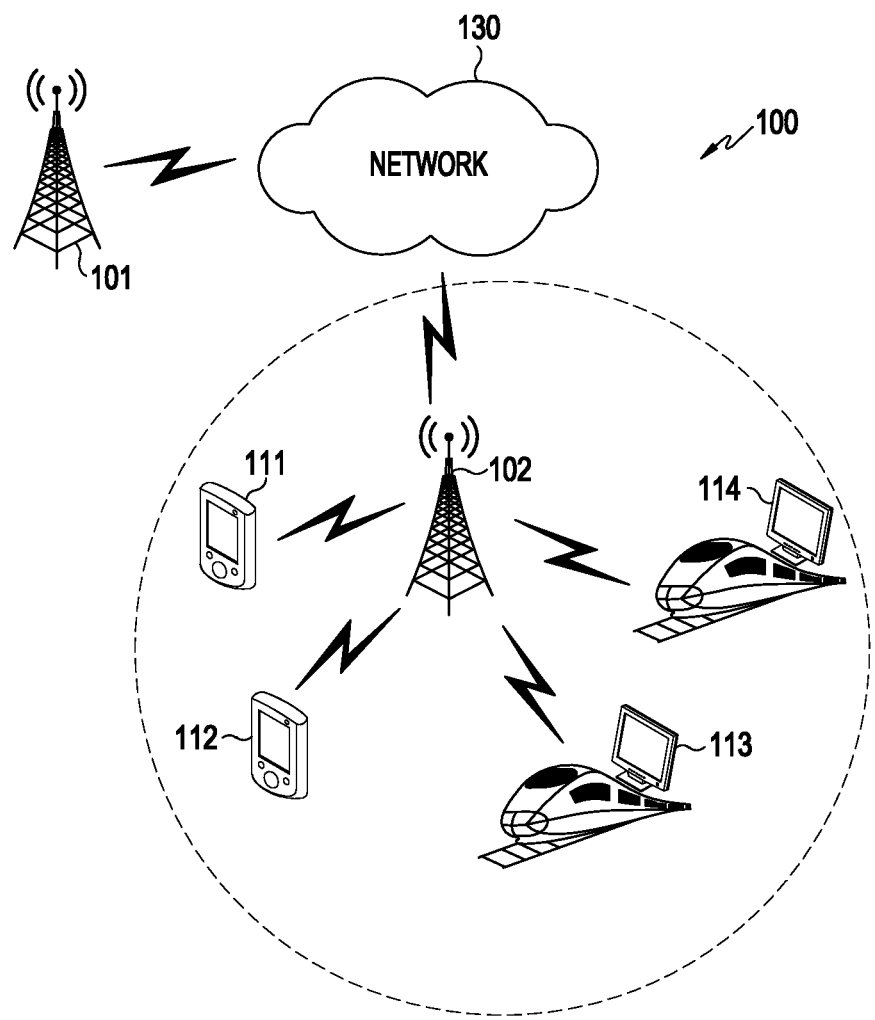
FIG. 1 illustrates an example wireless network according to various embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

At the beginning of the research and design of 5G communication systems, one goal is that the system can support scenarios with high mobility up to 500 km/h under a premise of ensuring service quality. This goal has been gradually improved in 4G and 5G communication standards in the frequency range below 6 GHz, and has been widely used in actual deployment. Current deployment scenarios of high speed train transmission mainly consider: high speed train (HST) single transmission point transmission (HST-Single Tap)); and high speed train multipoint single frequency transmission (HST-SFN). However, performance of high speed train scenarios currently defined by NR is only for a frequency range <6 GHz, with a maximum speed of 500 km/h. In addition, in view of the limitation of available frequency spectrum resources below 6 GHz, currently the data rate is still a bottleneck that limits user experience with respect to supporting terminals under high speed mobile scenarios. The aforementioned high speed may be a speed greater than or equal to 150 km/h or a speed greater than or equal to 250 km/h, but the present disclosure is not limited thereto.

In contrast, although a millimeter wave range is regarded to be a technology being able to support an ultra-high data rate, the application of millimeter wave spectrum resources in high speed mobile communication has not been widely developed due to technical differences and spectrum resource availability. Recently, with the expansion of the deployment of 5G communication systems, more and more millimeter wave systems have been put into practical application, and the need to introduce millimeter wave systems into high speed mobile scenarios is becoming more and more urgent. However, in view of an obvious limitation of propagation loss of the millimeter wave, along with a superposed challenge for a situation of high speed movement, there are many technical problems to be analyzed and solved urgently for application request supporting broadband high speed mobile communication in a millimeter wave band, compared with the 5G communication systems in the frequency range below 6 GHz.

At present, RF requirements, demodulation requirements and RRM requirements for below 6 GHz band are included in relevant communication specifications respectively in the 3GPP standard. At present, the scenarios related to high speed mobile scenarios can support 300 km/h and 500 km/h moving speeds based on an assumption of 2.69 GHz carrier frequency. While requirements for millimeter wave, i.e., frequency range 2 (FR 2), are included in relevant communication specifications, and currently a situation with a Doppler frequency shift above 300 Hz is not supported, that is, the moving speed of a terminal to be verified could not exceed 11.5 km/h.

In addition, at present, there are five power class (PC) types defined for millimeter wave terminals, and the corresponding relationships with respect to UE type are as follows:

Power class 1 (PC1): fixed wireless access (FWA) UE;
Power class 2 (PC2): vehicular UE;
Power class 3 (PC3): handheld UE;
Power class 4 (PC4): high-power non-handheld UE; and
Power class 5 (PC5): fixed wireless access (FWA) UE (with lower power than PC1).

Considering the challenge of implementing high speed mobile communication in a millimeter wave frequency range, PC2 (power class 2) and PC4 (power class 4) are the most likely power classes to support high speed mobility in the foreseeable future under the current power class definition framework. However, introduction of new power classes is not excluded. Furthermore, the design cost and size of a vehicle-mounted terminal or a high-power and train-mounted terminal would be greatly different from that of an ordinary handheld smart terminal. In addition, in view of the application characteristics of high speed mobile networks, the requirements of a high speed mobile terminal in terms of beam coverage and autonomous beam correspondence of the terminal are adjusted as compared to the current requirements of the ordinary handheld terminal. However, at present, the dedicated reporting of capabilities corresponding to the terminal power class is lacking, which may limit the network side and make it impossible to optimize the network configuration according to different mobile communication scenarios and terminal capabilities.

Challenges brought by high speed mobile communication to uplink and downlink transmissions and reception are specifically reflected in radio resource management (RRM), especially in handover delay, measurement, beam management (including beam failure detection and candidate beam detection performance) in connected mode. While in terms of demodulation, it also faces a huge influence of high Doppler frequency shift on achieving a target demodulation throughput. In actual deployment and application, in order to alleviate the above influence, it is necessary to make targeted adjustments to system configurations to adapt to the situation of high speed mobile scenarios. At this time, it is necessary to exchange relevant information between a terminal and a network system (for example, a network-side entity in the network system), so as to more effectively adjust respective parameter configurations of the terminal and the network system, thus ensuring the link maintenance and communication quality under a situation of high speed mobility of the terminal. However, at present, related optimization configuration and information exchange are not supported within the millimeter wave frequency range, which greatly affects the application of high speed mobile communication network in millimeter wave frequency range.

The present disclosure provides a solution to the above-mentioned problems: 1. The network side requires the terminal to report the termina's capability, or the network side receives the capability reported autonomously by the terminal from the terminal for the use of the network side, to adjust (or optimize) related system configuration at the network side, and make specialized configuration for the terminal; 2. If the network side detects that the terminal is operating in a certain high speed mode, the network side adjusts (or optimizes) the system configuration at the network side according to the current network deployment; and 3. The network side informs the terminal with corresponding system configuration update, for example, to adjust to a certain high speed operating mode.

The present disclosure provides a method of system information interaction, a terminal device and a network-side device (or a network-side entity, such as a base station), which relate to network-side behavior limitations and terminal behavior adjustments for different high speed mode and network deployment scenarios, so as to pertinently enhance system performance.

According to an exemplary embodiment of the present disclosure, there is provided a communication method performed by a terminal device (e.g., a user equipment (UE)): the terminal device receives an inquiry requiring the terminal device to report the terminal's capability (and/or operating mode) from a network side, in which the capability may include but is not limited to: a high speed capability, a high speed communication capability, a radio frequency capability and a mobility management capability, and the operating mode may include but is not limited to: a radio frequency operating mode, a mobility management operating mode and a high speed moving mode of the terminal; the terminal reports its capability (and/or operating mode) according to an actual situation according to the received request for reporting the capability (and/or operating mode) of the terminal required by the network side; the network side makes configuration adjustments according to the capability (and/or operating mode) information reported by the terminal and a high speed moving mode of the terminal (detected by the network side or reported by the terminal to the network side), in which the configuration adjustments include but are not limited to a system configuration adjustment of the network side and a configuration adjustment of the terminal side; and the terminal adjusts its configuration and operating mode according to a received specialized configuration adjustment for the terminal of the network side, in which the operating mode includes but is not limited to a radio frequency operating mode and a mobility management operating mode.

The present disclosure discloses schemes about that the network side requires the terminal device to report the operating state and/or capability and/or the terminal autonomously (or by default) reports the operating mode and/or capability, so that the network side can optimize the configuration according to the current terminal situation (that is, the current operating mode and capability of the terminal).

In one example of Scheme 1, according to the enquiry of the network side, the terminal device reports a capability of the terminal device for a power class defined for a high speed train roof-mounted type.

In one example of Scheme 2, according to the enquiry of the network side, the terminal device reports a capability of the terminal device for spherical coverage of beamforming in a high speed train mode.

In one example of Scheme 3, according to the enquiry of the network side, the terminal device reports a capability of the terminal device for beam correspondence in the high speed train mode.

In one example of Scheme 4, according to the enquiry of the network side, the terminal device reports a support capability of the terminal device for radio resource management under a situation of high speed movement.

Additionally or alternatively, the present disclosure discloses that the network side adjustments(for example, adjusts the corresponding configuration parameters of the network side) when it is confirmed that the terminal is in a high speed moving mode, according to the capability (such as a power class) and/or operating mode (the operating mode is optional) reported by the terminal, along with the mobile mode (such as the high speed moving mode) of the terminal monitored by the network side (or reported by the terminal to the network side). The adjustment of the network side includes but is not limited to below examples.

In one example of Scheme 1, adjusting the configuration of network-side parameters, and not configuring a long-cycle state for some parameters, which includes but is not limited to a synchronization signal block (SSB) periodicity, a channel state information reference signal (CSI-RS) periodicity and a discontinuous transmission (DRX) cycle.

In one example of Scheme 2, adjusting the beam coverage of the network side to match the beam related capacity of the terminal.

Additionally or alternatively, the present disclosure discloses that the network side transmits the adjusted configuration of the network side and/or the operating mode of the network side and/or the network scenario to the terminal when it is confirmed that the terminal is in a high speed moving mode, according to the capability (such as a power class) and/or operating mode (the operating mode is optional) reported by the terminal, along with the mobile mode (such as the high speed moving mode) of the terminal monitored by the network side (or reported by the terminal to the network side), so as to inform the terminal to adjust the behavior of the terminal side to match the requirement of the high speed moving mode. The adjustment of the behavior of the terminal side includes but is not limited to examples below.

In one example of Scheme 1, forbidding to switch a bore sight direction of a terminal antenna panel, that is, fixing the aiming direction of the terminal antenna panel, so as to match the configuration and/or operating mode of the network side.

In one example of Scheme 2, fixing the operating mode of the beam switching of the terminal in a certain bore sight direction on a certain beam, so as to match the configuration and/or operating mode of the network side.

In one example of Scheme 3, measuring radio resource management by the terminal according to a mode defined for the high speed moving mode.

Additional aspects and advantages of the present disclosure will be set forth in part in the description that follows, and these will become obvious from the description that follows, or may be learned by practice of the present disclosure.

Technical schemes of embodiments of the present application may be applied to various communication systems, such as global system for mobile communications (GSM)

system, code division multiple access (CDMA) system, wideband code division multiple Access (WCDMA) system, general packet radio service (GPRS), long term evolution (LTE) system, LTE frequency division duplex (FDD) system, LTE time division duplex (TDD), universal mobile telecommunication system (UMTS), worldwide interoperability for microwave access (WiMAX) communication system, 5th generation (5G) system or new radio (NR), etc. In addition, technical schemes of embodiments of the present application may be applied to future-oriented communication technologies.

FIG. 1 illustrates an example wireless network 100 according to various embodiments of the present disclosure. The embodiment of the wireless network 100 shown in FIG. 1 is for illustration only. Other embodiments of the wireless network 100 can be used without departing from the scope of the present disclosure.

The wireless network 100 includes a gNodeB (gNB) 101 and a gNB 102. gNB 101 communicates with gNB 102. gNB 101 also communicates with at least one Internet Protocol (IP) network 130, such as the Internet, a private IP network, or other data networks.

Depending on a type of the network, other well-known terms such as "base station" or "access point" can be used instead of "gNodeB" or "gNB." For convenience, the terms "gNodeB" and "gNB" are used in this patent document to refer to network infrastructure components that provide wireless access for remote terminals and related core network functionality modules thereof. And, depending on the type of the network, other well-known terms such as "mobile station," "user station," "terminal," "remote terminal," "wireless terminal" or "user apparatus" can be used instead of "user equipment" or "UE." In this application, "UE" and "terminal" are used interchangeably. For convenience, the terms "user equipment" and "UE" are used in this patent document to refer to remote wireless devices that wirelessly access the gNB, no matter whether the UE is a mobile device (such as a mobile phone or a smart phone) or a fixed device (such as a desktop computer or a vending machine) or a vehicle/train-mounted mobile terminal device. It should be noted that the vehicle/train-mounted mobile terminal device may be the same or different from common mobile devices in design and size.

A gNB 102 provides wireless broadband access to the network 130 for a plurality of User Equipments (UEs) within a coverage area 120 of the gNB 102. The UE may be a common mobile device, such as a cellular phone, a wireless laptop computer, a wireless PDA, etc., as shown by 111 and 112. In addition, the UE may be a vehicle/train-mounted mobile terminal device, as shown by 113 and 114. The "vehicle" may be a high speed train, such as a high speed rail. In some embodiments, one or more of gNBs 101-102 can communicate with each other and with UEs 111-114 using 5G, 6G, new radio (NR), long term evolution (LTE), LTE-A, WiMAX or other advanced wireless communication technologies.

The dashed lines show an approximate range of the coverage area 120, and the ranges are shown as approximate circles merely for illustration and explanation purposes. It should be clearly understood that the coverage areas associated with the gNBs, such as the coverage area 120, may have other shapes, including irregular shapes, depending on configurations of the gNBs and changes in the radio environment associated with natural obstacles and man-made obstacles.

As will be described in more detail below, one or more of gNB 101 and gNB 102 include a 2D antenna array as described in embodiments of the present disclosure. In some embodiments, one or more of gNB 101 and gNB 102 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 101-102 can directly communicate with the network 130 and provide direct wireless broadband access to the network 130 for the UEs. In addition, gNB 101 and/or 102 can provide access to other or additional external networks, such as external telephone networks or other types of data networks.

Figure 2A:
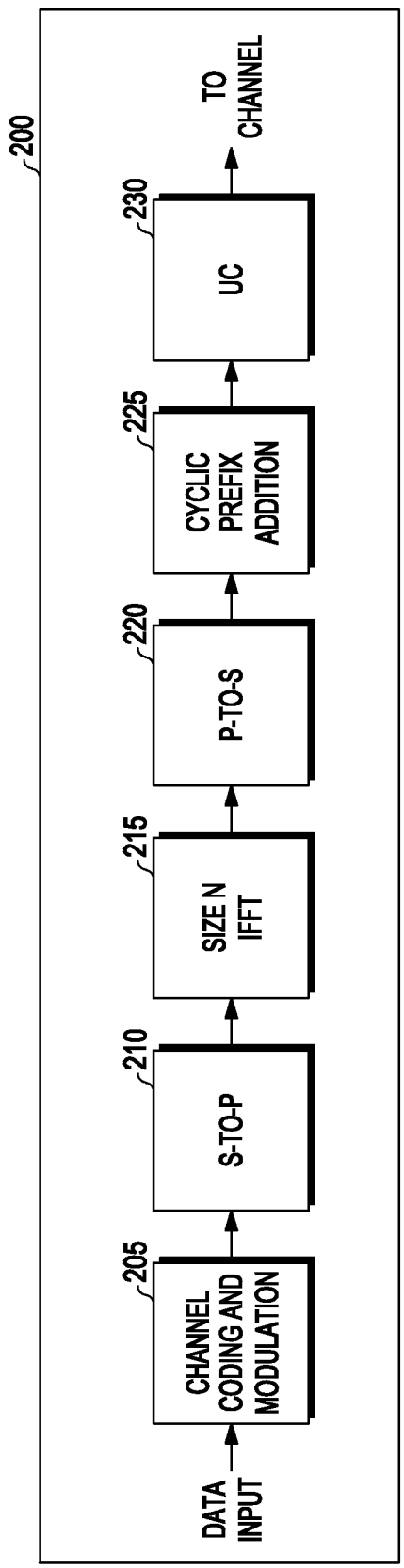
FIGS. 2A and 2B illustrate example wireless transmission and reception paths according to embodiments of the present disclosure.
Figure 2B:
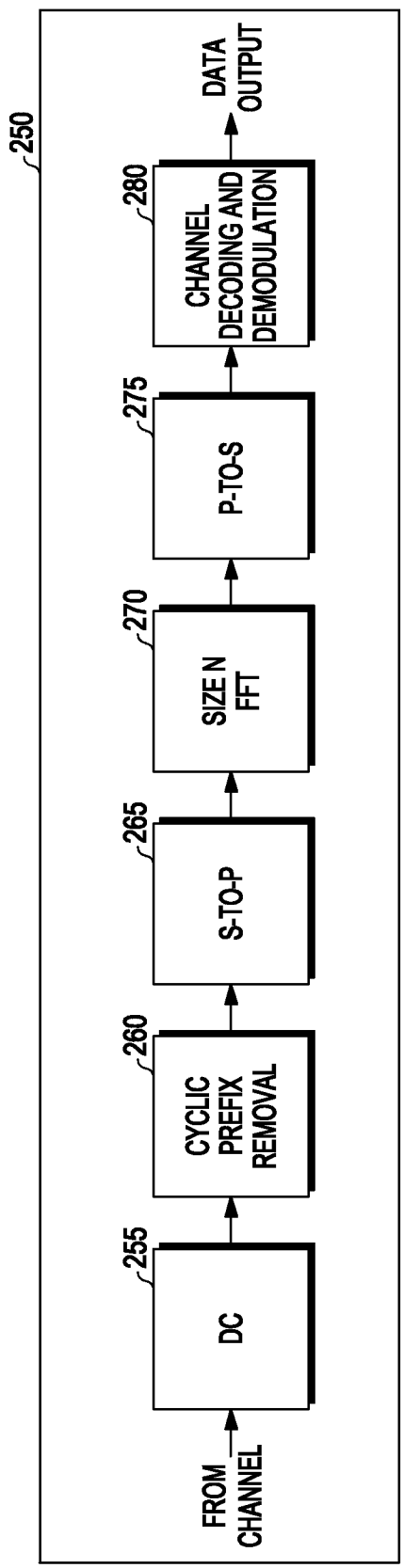

FIGS. 2a and 2b illustrate example wireless transmission and reception paths according to the present disclosure. In the following description, the transmission path 200 can be described as being implemented in a gNB, such as gNB 102, and the reception path 250 can be described as being implemented in a UE, such as UE 114. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the present disclosure.

The transmission path 200 includes a channel coding and modulation block 205, a serial-to-parallel (S-to-P) block 210, a size N inverse fast Fourier transform (IFFT) block 215, a parallel-to-serial (P-to-S) block 220, a cyclic prefix addition block 225, and an up-converter (UC) 230. The reception path 250 includes a down-converter (DC) 255, a cyclic prefix removal block 260, a serial-to-parallel (S-to-P) block 265, a size N fast Fourier transform (FFT) block 270, a parallel-to-serial (P-to-S) block 275, and a channel decoding and demodulation block 280.

In the transmission path 200, the channel coding and modulation block 205 receives a set of information bits, applies coding (such as low density parity check (LDPC) coding), and modulates the input bits (such as using quadrature phase shift keying (QPSK) or quadrature amplitude modulation (QAM)) to generate a sequence of frequency-domain modulated symbols. The serial-to-parallel (S-to-P) block 210 converts (such as demultiplexes) serial modulated symbols into parallel data to generate N parallel symbol streams, where N is a size of the IFFT/FFT used in gNB 102 and UE 114. The size N IFFT block 215 performs IFFT operations on the N parallel symbol streams to generate a time-domain output signal. The parallel-to-serial block 220 converts (such as multiplexes) parallel time-domain output symbols from the size N IFFT block 215 to generate a serial time-domain signal. The cyclic prefix addition block 225 inserts a cyclic prefix into the time-domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from the gNB 102 arrives at the UE 114 after passing through the wireless channel, and operations in reverse to those at the gNB 102 are performed at the UE 114. The down-converter 255 down-converts the received signal to a baseband frequency, and the cyclic prefix removal block 260 removes the cyclic prefix to generate a serial time-domain baseband signal. The serial-to-parallel block 265 converts the time-domain baseband signal into a parallel time-domain signal. The size N FFT block 270 performs an FFT algorithm to generate N parallel frequency-domain signals. The parallel-to-serial block 275 converts the parallel frequency-domain signal into a sequence of modulated data symbols. The channel decoding and demodulation block 280 demodulates and decodes the modulated symbols to recover the original input data stream.

Each of gNBs 101-102 may implement a transmission path 200 similar to that for transmitting to UEs 111-114 in the downlink, and may implement a reception path 250 similar to that for receiving from UEs 111-114 in the uplink. Similarly, each of UEs 111-114 may implement a transmission path 200 for transmitting to gNBs 101-102 in the uplink, and may implement a reception path 250 for receiving from gNBs 101-102 in the downlink.

Each of the components in FIGS. 2a and 2b can be implemented using only hardware, or using a combination of hardware and software/firmware. As a specific example, at least some of the components in FIGS. 2a and 2b may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the present disclosure. Other types of transforms can be used, such as discrete Fourier transform (DFT) and inverse discrete Fourier transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2a and 2b illustrate examples of wireless transmission and reception paths, various changes may be made to FIGS. 2a and 2b. For example, various components in FIGS. 2a and 2b can be combined, further subdivided or omitted, and additional components can be added according to specific requirements. Furthermore, FIGS. 2a and 2b are intended to illustrate examples of types of transmission and reception paths that can be used in a wireless network. Any other suitable architecture can be used to support wireless communication in a wireless network.

Figure 3A:
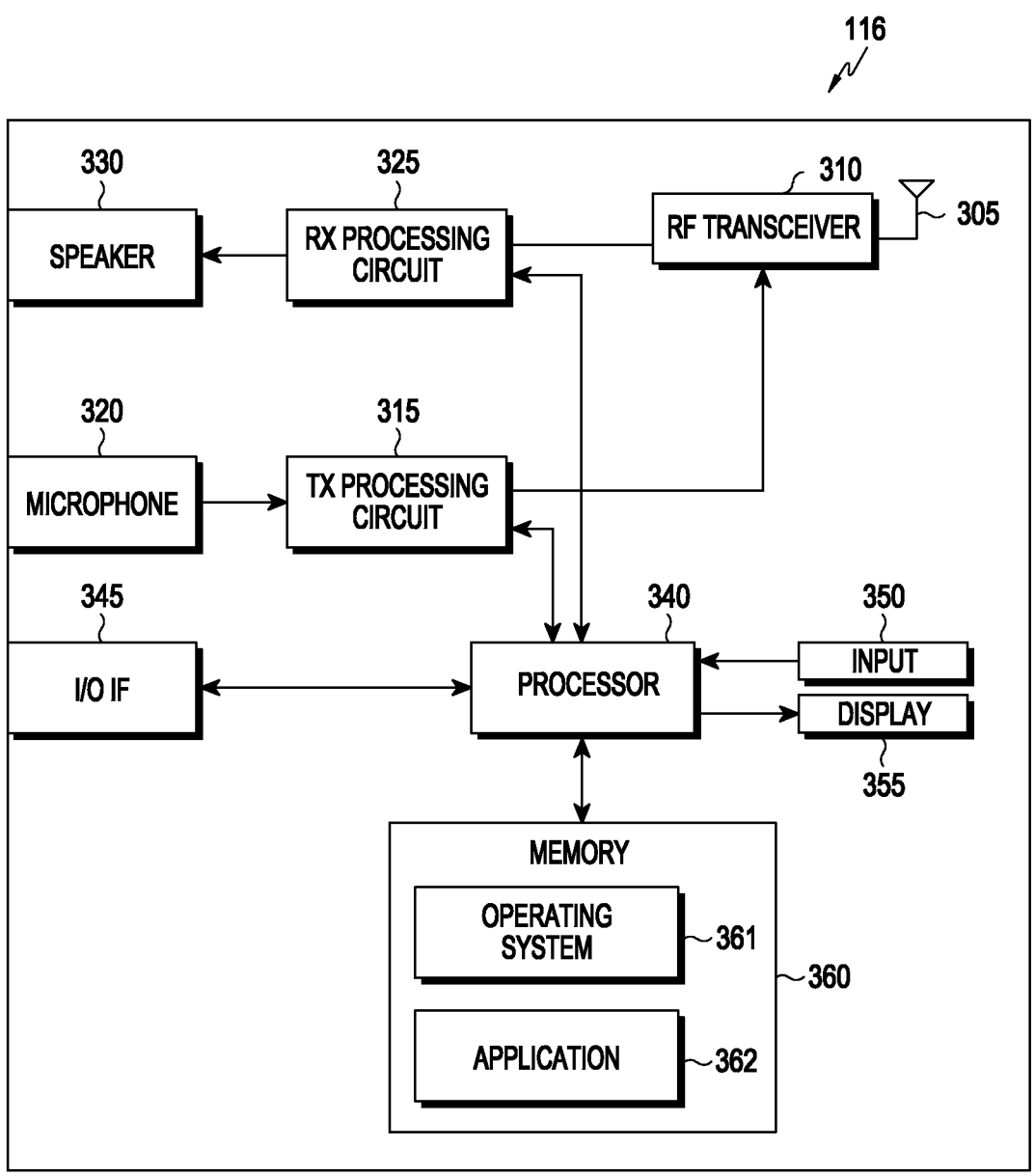
FIG. 3A illustrates an example UE according to an embodiment of the present disclosure.

FIG. 3a illustrates an example UE 114 according to the present disclosure. The embodiment of UE 114 shown in FIG. 3a is for illustration only, and UEs 111-113 of FIG. 1 can have the same or similar configuration. However, a UE has various configurations, and FIG. 3a does not limit the scope of the present disclosure to any specific implementation of the UE.

The UE 114 includes an antenna 305, a radio frequency (RF) transceiver 310, a transmission (TX) processing circuit 315, a microphone 320, and a reception (RX) processing circuit 325. UE 114 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 114. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the present disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 114 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 114 can input data into UE 114 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3a illustrates an example of UE 114, various changes can be made to FIG. 3a. For example, various components in FIG. 3a can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3a illustrates that the UE 114 is configured as a mobile phone or a smart phone, UEs can be configured to operate as other types of mobile or fixed devices, such as vehicle/train-mounted terminal devices, and may be handheld or non-handheld.

Figure 3B:
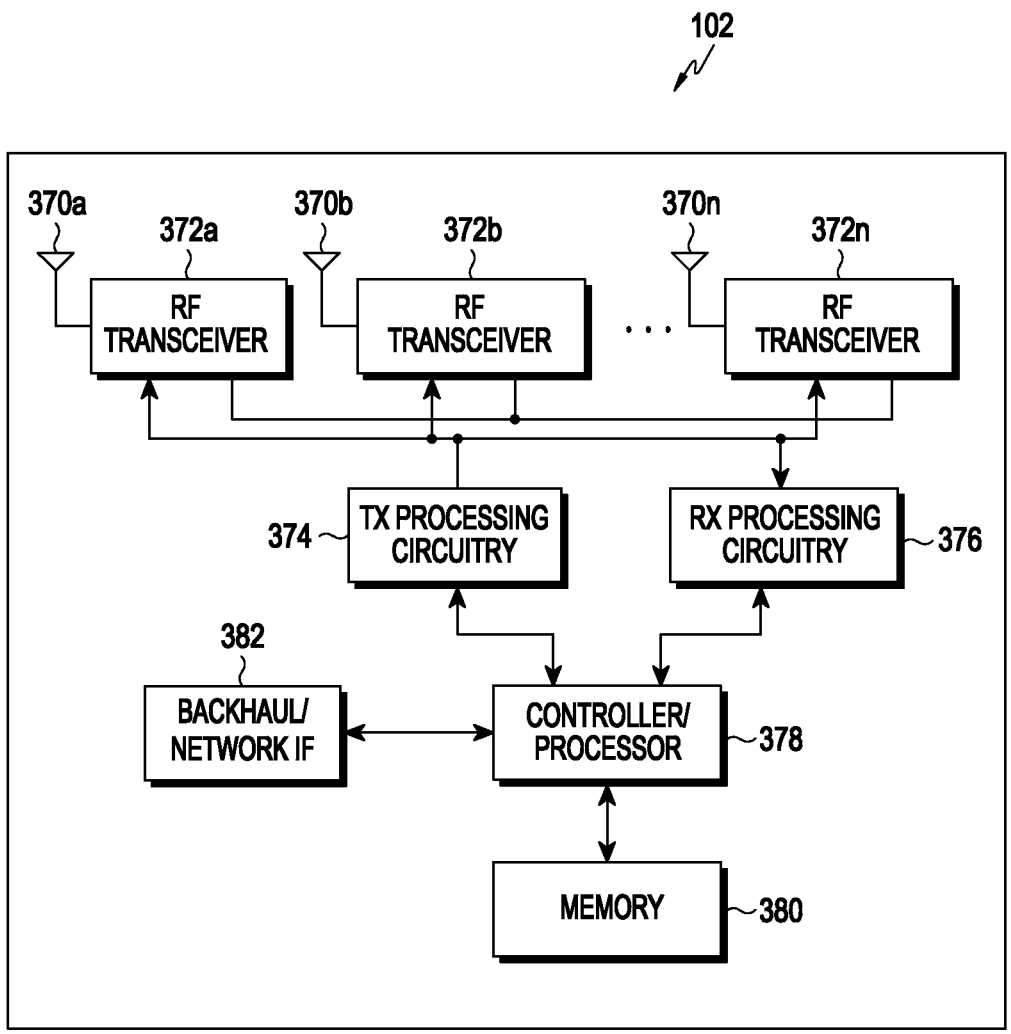
FIG. 3B illustrates an example gNB according to an embodiment of the present disclosure.

FIG. 3*b* illustrates an example gNB 102 according to the present disclosure. The embodiment of gNB 102 shown in FIG. 3*b* is for illustration only, and other gNBs of FIG. 1 can have the same or similar configuration. However, a gNB has various configurations, and FIG. 3*b* does not limit the scope of the present disclosure to any specific implementation of a gNB. It should be noted that the gNB 101 can include the same or similar structures as the gNB 102.

As shown in FIG. 3*b*, the gNB 102 includes a plurality of antennas 370*a*-370*n*, a plurality of RF transceivers 372*a*-372*n*, a transmission (TX) processing circuit 374, and a reception (RX) processing circuit 376. In certain embodiments, one or more of the plurality of antennas 370*a*-370*n* include a 2D antenna array. The gNB 102 also includes a controller/processor 378, a memory 380, and a backhaul or network interface 382.

RF transceivers 372*a*-372*n* receive an incoming RF signal from antennas 370*a*-370*n*, such as a signal transmitted by UEs or other gNBs. RF transceivers 372*a*-372*n* down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372*a*-372*n* receive the outgoing processed baseband or IF signal from TX processing circuit 374 and up-convert the baseband or IF signal into an RF signal transmitted via antennas 370*a*-370*n*.

The controller/processor 378 can include one or more processors or other processing devices that control the overall operation of gNB 102. For example, the controller/processor 378 can control the reception of forward channel signals and the transmission of backward channel signals through the RF transceivers 372*a*-372*n*, the RX processing circuit 376 and the TX processing circuit 374 according to well-known principles. The controller/processor 378 can also support additional functions, such as higher-level wireless communication functions. For example, the controller/processor 378 can perform a blind interference sensing (BIS) process such as that performed through a BIS algorithm, and decode a received signal from which an interference signal is subtracted. A controller/processor 378 may support any of a variety of other functions in the gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the present disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows the gNB 102 to communicate with other devices or systems through a backhaul connection or through a network. The backhaul or network interface 382 can support communication over any suitable wired or wireless connection(s). For example, when the gNB 102 is implemented as a part of a cellular communication system, such as a cellular communication system supporting 5G or new radio access technology or NR, LTE or LTE-A, the backhaul or network interface 382 can allow the gNB 102 to communicate with other gNBs through wired or wireless backhaul connections. When the gNB 102 is implemented as an access point, the backhaul or network interface 382 can allow the gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372*a*-372*n*, TX processing circuit 374 and/or RX processing circuit 376) support aggregated communication with FDD cells and TDD cells.

Although FIG. 3*b* illustrates an example of gNB 102, various changes may be made to FIG. 3*b*. For example, the gNB 102 can include any number of each component shown in FIG. 3*a*. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, the gNB 102 can include multiple instances of each (such as one for each RF transceiver).

The exemplary embodiments of the present disclosure are further described below in conjunction with the accompanying drawings.

The text and drawings are provided as examples only to help readers understand the present disclosure. They are not intended and should not be interpreted as limiting the scope of the present disclosure in any way. Although certain embodiments and examples have been provided, based on the content disclosed herein, it is obvious to those skilled in the art that modifications to the illustrated embodiments and examples can be made without departing from the scope of the present disclosure.

Figure 4:
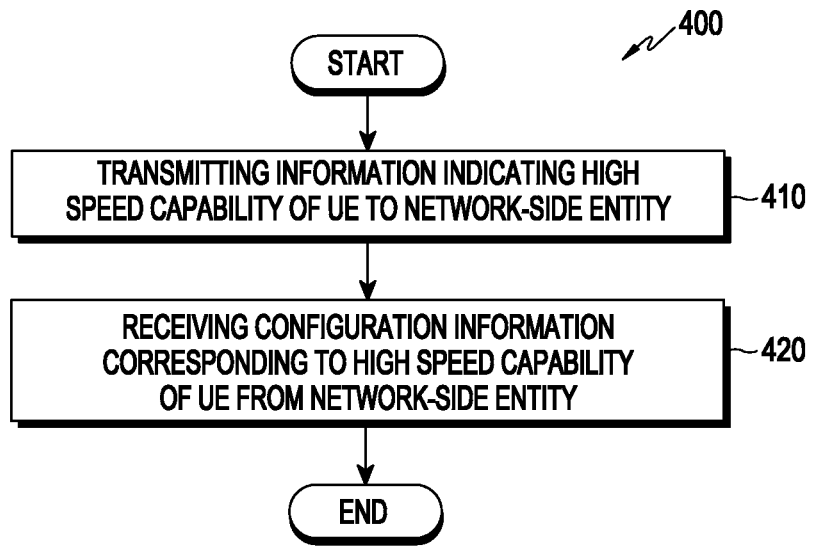
FIG. 4 illustrates a method performed by a UE according to an embodiment of the present disclosure.

FIG. 4 illustrates a method performed by a UE according to an embodiment of the present disclosure. The method involves a method that the network side triggers the UE to report the supported capability (e.g., information about supporting high speed mobile communication) and/or operating state in high frequency (e.g., in millimeter wave (FR2) frequency range), or the UE autonomously reports the capability and/or operating mode, for the reference by the network side, so that the network side processes, judges and updates configuration information for the network side and the UE at the network side according to the capability and/or operating state reported by the UE, and informs the UE of the configuration information, so as to improve the communication connection effect of the system in the high speed mobile scenario and ensure the communication quality.

As shown in FIG. 4, in step 410, a user equipment (UE) may transmit UE capability information to a network-side entity, for example, information indicating a high speed capability of the UE. The UE may transmit a UE capability and/or operating mode to the network-side entity. The transmission operation may be triggered by the network side to be performed by the UE, or the UE performs the transmission autonomously/by default. The capability information transmitted by the UE may include a power class of the UE itself and/or other capability information that supports maintaining communication in a high speed moving mode.

The capabilities of the UE in step 410 may include but are not limited to the following types (Type 1-1, Type 1-2 and Type 1-3).

In one example of Type 1-1, a power class corresponding to the high speed capability of the UE is reported by the UE according to an inquiry of the network side or autonomously, in which the power class indirectly indicates a situation that the UE supports the high speed mobile capability, in particular, whether the UE supports a roof-mounted high speed train scenario may be implicitly indicated when indicating the supported UE power class.

Type 1-1 is discussed below in terms of two possibilities on how to define UE power class.

The first possibility is to enable an existing power class to indirectly indicate that the UE supports the high speed mobile capability. Such a power class is described below by taking power class 4 as an example, and the UE type corresponding to power class 4 may be updated as "high-power and non-handheld UE for HST," as shown in Table 1 below.

TABLE 1

UE type assumption

| UE power class | UE type |
|---|---|
| 1 | Fixed wireless access (FWA) UE |
| 2 | Vehicle UE |
| 3 | Handheld UE |
| 4 | High-power and non-handheld UE for HST |
| 5 | Fixed wireless access (FWA) UE (lower power) |

As shown in Table 1 above, since the UE type corresponding to power class 4 is "high-power and non-handheld UE for HST," the network side can determine that the UE is a UE supporting high speed mobility when receiving power class 4. However, when the network side receives power classes 1, 2, 3, and 5, the network side cannot determine whether the UE supports high speed mobility.

In order to support the HST operating mode, the spherical coverage behavior of a transmitter and a receiver of UE power class 4 may be optimized accordingly to match the high speed capability of the UE. RF requirements optimization/adjustment for the high speed scenario to match the high speed capability of the UE can be as follows, but not limited thereto.

One of the RF requirement optimization/adjustment for the high speed mobile application scenario to match the high speed capability of the UE would be an effective isotropic radiated power (EIRP) spherical coverage of UE. As shown below, the minimum effective isotropic radiated power (EIRP) at a specific percentile (for example, the 20th percentile, but the present disclosure is not limited thereto, and other percentiles can also be included) of the distribution of radiated power measured over the full sphere around the UE is defined as a spherical coverage requirement, and the value of EIRP is adjusted for the high speed mobile application scenario of the UE to match the high speed capability of the UE, as shown in Table 2 below.

The minimum effective isotropic radiated power (EIRP) at the 20th percentile of the distribution of radiated power measured over the full sphere around the UE is defined as the spherical coverage requirement. The requirement is verified with the test metric of EIRP (link=spherical coverage grid, meas=link angle).

TABLE 2

UE Spherical coverage for power class 4

| Operating band | Min EIRP at 20%-tile CDF (dBm) |
|---|---|
| n257 | 25 |
| n258 | 25 |
| n260 | 19 |
| n261 | 25 |

Note 1:
Minimum EIRP at 20%-tile CDF is defined as a lower limit without tolerance.
Note 2:
The requirement in this table is verified only under a normal temperature condition.
The values of "20%" and EIRP in the above table are only examples, and the present disclosure is not limited thereto.

A second RF requirement optimization/adjustment for the high speed=scenario to match the high speed capability of the UE can be an equivalent isotropic sensitivity (EIS) spherical coverage. As shown below, the maximum EIS at a specific percentile (for example, the 20th percentile, but the present disclosure is not limited thereto, and other percentiles can also be included) of CCDF of EIS measured over the full sphere around the UE is defined as a spherical coverage requirement, and the value of EIS is adjusted for the high speed mobile application scenario of the UE to match the high speed capability of the UE, as shown in Table 3 below.

The maximum EIS at the 20th percentile of the CCDF of EIS measured over the full sphere around the UE is defined as the spherical coverage requirement in Table 3 below. This requirement is verified with the test metric of EIS (Link=spherical coverage grid, meas=link angle).

TABLE 3

EIS spherical coverage for power class 4

| Operating band | EIS at $20^{th}$ %-tile CCDF for HST capable UE(dBm)/ Channel bandwidth | | | |
|---|---|---|---|---|
| | 50 MHz | 100 MHz | 200 MHz | 400 MHz |
| n257 | −88.0 | −85.0 | −82.0 | −79.0 |
| n258 | −88.0 | −85.0 | −82.0 | −79.0 |
| n260 | −83.0 | −80.0 | −77.0 | −74.0 |
| n261 | −88.0 | −85.0 | −82.0 | −79.0 |

Note 1:
the transmitter may be set to $P_{UMAX}$, which is the measured peak of EIRP.
Note 2:
The EIS spherical coverage requirements are verified only under a normal thermal conditions.
The values of "20%" and EIS in the above table are only examples, and the present disclosure is not limited thereto.

A third RF requirement optimization/adjustment for the high speed scenario to match the high speed capability of the UE can be beam correspondence, as follows.

In one example, whether beamCorrespondenceWithoutUL-BeamSweeping is supported or not, defines that UE needs to meet the error requirement of autonomous beam correspondence to complete autonomous uplink beam correspondence.

In one example, beamCorrespondenceWithoutUL-BeamSweeping and eBeamCorrespondenceSSB are supported, which defines based on which side conditions of SSB-based L1-RSRP measurements that the UE completes autonomous uplink beam correspondence.

In one example, beamCorrespondenceWithoutUL-BeamSweeping and eBeamCorrespondenceCSI-RS are supported, which defines based on which side conditions of CSI-R-based L1-RSRP measurements that the UE completes autonomous uplink beam correspondence.

It has been described above that the RF requirements based on non-high-speed mobile UE need to be adjusted (or modified) for the high speed mobile application scenario of UE, such as the requirements of EIRP spherical coverage and EIS spherical coverage. According to the present disclosure, it is also possible to add new RF requirements dedicated to high speed mobile UE without adjustment and modification on existing RF requirements based on non-high-speed mobile UE.

For example, taking power class 2 as an example, the minimum EIRP at a specified percentile (X%) of the distribution of radiated power measured over the full sphere around the UE and/or the maximum EIS at a specified percentile (X%) of CCDF of EIS measured over the full sphere around the UE can be defined as newly added spherical coverage requirements dedicated to high speed communication of the UE. For example, for power class 2, new additions may include but not limited to the following UE EIRP spherical coverage, EIS spherical coverage and beam correspondence, and examples are as follows.

The minimum EIRP at a specified percentile of the distribution of radiated power measured over the full sphere around the UE is defined as the spherical coverage requirement in Table 4 below. This requirement is verified by a test for EIRP (link=spherical coverage grid, meas=link angle).

TABLE 4

UE EIRP spherical coverage for power class 2

| Operating band | The minimum EIRP (dBm) at 60%-tile CDF for the normal PC2 UE | The minimum EIRP (dBm) at X %-tile CDF for HST capable PC2 UE (Note 3) |
|---|---|---|
| n257 | 18.0 | *** |
| n258 | 18.0 | *** |
| n261 | 18.0 | *** |

Note 1:
Minimum EIRP at 60%-tile CDF is defined as the lower limit without tolerance.
Note:
The requirements in Table 4 are verified only under a normal temperature condition.
Note 3:
If [FR2 HST capability bit] is supported, this requirement is applied to UE.
The values of "60%" and EIRP in the above table are only examples, and the present disclosure is not limited thereto.

The maximum EIS at a specified percentile of CCDF of EIS measured over the full sphere around the UE is defined as the spherical coverage requirement in Table 5 below. This requirement is verified with the test for EIS (link=spherical coverage grid, meas=link angle).

TABLE 5

EIS spherical coverage for power class 2

| | EIS (dBm) at 60%-tile CCDF/ channel bandwidth | | | | EIS (dBm) at $X^{th}$ %-tile CCDF/channel bandwidth [Note 3] | | | |
|---|---|---|---|---|---|---|---|---|
| Operating band | 50 MHz | 100 MHz | 200 MHz | 400 MHz | 50 MHz | 100 MHz | 200 MHz | 400 MHz |
| n257 | −81.0 | −78.0 | −75.0 | −72.0 | *** | *** | *** | *** |
| n258 | −81.0 | −78.0 | −75.0 | −72.0 | *** | *** | *** | *** |
| n261 | −81.0 | −78.0 | −75.0 | −72.0 | *** | *** | *** | *** |

Note 1:
the transmitter may be set to $P_{UMAX}$, which is the measured peak of EIRP.
Note 2:
The EIS spherical coverage requirement is verified only under a normal thermal condition.
Note 3:
If [FR2 HST capability bit] is supported, this requirement is applied to UE.
The values of "60%" and EIS in the above table are only examples, and the present disclosure is not limited thereto.

For beam correspondence, in the case that the UE has power class 2 and supports HST capability, the beam correspondence corresponding to the high speed capability of the UE may have the following two possibilities, but is not limited to the following two possibilities.

In one example of possibility 1, defining corresponding requirements for both situations of beamCorrespondenceWithoutUL-BeamSweeping supported and beamCorrespondenceWithoutUL-BeamSweeping not presented.

In one example of possibility 2, defining corresponding requirements for the situation of beamCorrespondenceWithoutUL-BeamSweeping supported.

For example, taking power class 4 as an example, the minimum EIRP at a specified percentile (X% and/or Y%) of the distribution of radiated power measured over the full sphere around the UE and/or the maximum EIS at a specified percentile (X% and/or Y%) of CCDF of EIS measured over the full sphere around the UE may be defined as a newly added spherical coverage requirement dedicated to high speed communication of the UE. For example, for power class 4, new additions may include but not limited to the UE EIRP spherical coverage, EIS spherical coverage and beam correspondence, and examples are as follows.

In one Example 1 of newly added UE EIRP spherical coverage for power class 4, the minimum EIRP at a defined percentile of the distribution of radiated power measured over the full sphere around the UE is defined as the spherical coverage requirement in Table 6 below. This requirement is verified by a test for EIRP (link=spherical coverage grid, meas=link angle).

TABLE 6

UE EIRP spherical coverage for power class 4

| Operating band | The minimum EIRP (dBm) at 20%-tile CDF for normal PC4 UE | The minimum EIRP (dBm) at X %-tile CDF for HST capable PC4 UE (Note 3) |
|---|---|---|
| n257 | 25 | *** |
| n258 | 25 | *** |
| n260 | 19 | *** |
| n261 | 25 | *** |

Note 1:
Minimum EIRP at 20%-tile CDF is defined as the lower limit without tolerance.
Note 2:
The requirement in this table is verified only under a normal temperature condition.
Note 3:
If [FR2 HST capability bit] is supported, this requirement is applied to UE.
The above values of "20%" and EIRP are only examples, and the present disclosure is not limited thereto.

In one Example 2 of newly added UE EIRP spherical coverage for power class 4, the minimum EIRP at a defined percentile of the distribution of radiated power measured over the full sphere around the UE is defined as the spherical coverage requirement in Table 7 below. This requirement is verified by a test for EIRP (link=spherical coverage grid, meas=link angle).

TABLE 7

UE EIRP spherical coverage for power class 4

| Operating band | The UE minimum EIRP (dBm) at 20%-tile CDF for normal PC4 UE | The minimum EIRP (dBm) at X %-tile CDF for HST capable PC4 UE (Note 3) | The minimum EIRP (dBm) at Y %-tile CDF for HST capable PC4 UE (Note 4) |
|---|---|---|---|
| n257 | 25 | *** | *** |
| n258 | 25 | *** | *** |
| n260 | 19 | *** | *** |
| n261 | 25 | *** | *** |

Note 1:
Minimum EIRP at 20%-tile CDF is defined as the lower limit without tolerance.
Note 2:
The requirement in this table is verified only under a normal temperature condition.
Note 3:
If [FR2 HST capability bit] is supported and multi-beam (panel) activity capability is not shown, this requirement is applied to UE.
Note 4:
If [FR2 HST capability bit] and multi-beam (panel) capability are supported, this requirement is applied to UE.
The above values of "20%" and EIRP are only examples, and the present disclosure is not limited thereto.

In one Example 1 of newly added UE EIS spherical coverage for power class 4, EIS spherical coverage for power class 4, the maximum EIS at a defined percentile of CCDF of EIS measured over the full sphere around the UE is defined as the spherical coverage requirement in Table 8 below. This requirement is verified by a test for EIS (link=spherical coverage grid, meas=link angle).

TABLE 8

EIS spherical coverage for power class 4

| Operating band | EIS (dBm) at 20%-tile CCDF/channel bandwidth for normal PC4 UE | | | | EIS (dBm) at $X^{th}$ %-tile CCDF/channel bandwidth for HST capable PC4 UE of (Note 3) | | | |
|---|---|---|---|---|---|---|---|---|
| | 50 MHz | 100 MHz | 200 MHz | 400 MHz | 50 MHz | 100 MHz | 200 MHz | 400 MHz |
| n257 | −88.0 | −85.0 | −82.0 | −79.0 | *** | *** | *** | *** |
| n258 | −88.0 | −85.0 | −82.0 | −79.0 | *** | *** | *** | *** |
| n260 | −83.0 | −80.0 | −77.0 | −74.0 | *** | *** | *** | *** |
| n261 | −88.0 | −85.0 | −82.0 | −79.0 | *** | *** | *** | *** |

Note 1:
the transmitter may be set to $P_{UMAX}$, which is the measured peak of EIRP.
Note 2:
The EIS spherical coverage requirement is verified only under a normal thermal condition.
Note 3:
If [FR2 HST capability bit] is supported, this requirement is applied to UE.
The above values of "20%" and EIS are only examples, and the present disclosure is not limited thereto.

In one Example 2 of newly added UE EIS spherical coverage for power class 4, EIS spherical coverage for power class 4, the maximum EIS at a defined percentile of CCDF of EIS measured over the full sphere around the UE is defined as the spherical coverage requirement in Table 9 below. This requirement is verified by a test for EIS (link=spherical coverage grid, meas=link angle).

TABLE 9

EIS spherical coverage for power class 4

| Operating band | EIS (dBm) at $20^{th}$ %-tile CCDF/channel bandwidth for normal PC4 UE | | | | EIS (dBm) at $X^{th}$ %-tile CCDF/channel bandwidth for HST capable PC4 UE (Note 3) | | | |
|---|---|---|---|---|---|---|---|---|
| | 50 MHz | 100 MHz | 200 MHz | 400 MHz | 50 MHz | 100 MHz | 200 MHz | 400 MHz |
| n257 | −88.0 | −85.0 | −82.0 | −79.0 | *** | *** | *** | *** |
| n258 | −88.0 | −85.0 | −82.0 | −79.0 | *** | *** | *** | *** |
| n260 | −83.0 | −80.0 | −77.0 | −74.0 | *** | *** | *** | *** |
| n261 | −88.0 | −85.0 | −82.0 | −79.0 | *** | *** | *** | *** |

Note 1:
the transmitter may be set to $P_{UMAX}$, which is the measured peak of EIRP.
Note 2:
The EIS spherical coverage requirement is verified only under a normal thermal condition.
Note 3:
If [FR2 HST capability bit] is supported and multi-beam (panel) activity capability is not shown, this requirement is applied to UE.
Note 4:
If [FR2 HST capability bit] and multi-beam (panel) capability are supported, this requirement is applied to UE.
The above values of "20%" and EIS are only examples, and the present disclosure is not limited thereto.

For beam correspondence, in the case that the UE has power class 4 and supports HST capability, the beam correspondence corresponding to the high speed capability of the UE may have the following possibilities but is not limited thereto.

The corresponding requirements are defined for the situation of beamCorrespondenceWithoutUL-BeamSweeping supported, and adding an additional condition of Doppler shift is not excluded.

The second possibility is to introduce a new UE power class dedicated for the HST scenario. The newly introduced UE power class is numbered as 6 in Table 10 below, but this is only an example, and number of the newly introduced UE power class is not limited thereto.

TABLE 10

Assumptions of UE Type

| UE power class | UE type |
|---|---|
| 1 | Fixed wireless access (FWA) UE |
| 2 | Vehicle UE |
| 3 | Handheld UE |
| 4 | High-power and non-handheld UE |
| 5 | Fixed wireless access (FWA) UE (lower power) |
| 6 | high-power and non-handheld UE for HST |

As shown in Table 10 above, since the UE type corresponding to power class 6 is "high-power and non-handheld UE for HST," the network side can determine that the UE is a UE supporting high speed mobility when receiving power class 6. However, when the network side receives one of the power classes 1-5, the network side cannot determine whether the UE supports high speed mobility.

As described above the UE RF requirements optimization/adjustment for high speed scenarios may be defined to match the high speed capability of the UE, such as the aforementioned EIRP spherical coverage, EIS spherical coverage and beam correspondence.

Type 1-2: information indicating whether the UE supports high speed mobility and/or the maximum moving speed supported by the UE.

When the UE reports its capability to maintain communication under a situation of high speed movement (or it can be referred to as UE high speed capability or UE high speed communication capability) in the frequency range of millimeter wave autonomously or according to the enquiry of the network side, it has been described in Type 1-1 that whether the UE supports high speed mobility may be indicated by the power class reported by the UE. However, it is also possible to use information separate from the power class (for example, capability indication) to indicate whether the UE supports high speed mobility. For example, a capability indication of HST may be introduced specifically for FR2. The capability indication may be capability information of a single bit or capability information of two or more bits. The capability indication may indicate whether the UE supports high speed mobility.

Additionally or alternatively, the capability indication may also correspond to different speed levels. Additionally or alternatively, the capability indication may also indicate the maximum moving speed supported by the UE. However, it should be noted that this capability is not suitable for an FWA-type UE. The following Table 11 shows an example of the applicability of this UE capability to the terminal capability class.

TABLE 11

Assumptions of UE type [for example only]

| UE power class | UE type | HST capability applicability |
|---|---|---|
| 1 | Fixed wireless access (FWA) UE | NA |
| 2 | Vehicle UE | √ |
| 3 | Handheld UE | √ |
| 4 | High-power and non-handheld UE | √ |
| 5 | Fixed wireless access (FWA) UE (lower power) | NA |

An example of the definition of this terminal capability is shown in Table 12 below.

TABLE 12

HST capability

| HST ability | | annotation |
|---|---|---|
| Possibility 1: 1 bit | Yes: supported | No: Not supported. |
| Possibility 2: more than 1 bit for forward compatibility (for example, 2 bits) | 00 | NA/reserved |
| | 01 | Up to 250 km/h |
| | 10 | Up to 350 km/h |
| | 11 | Up to 500 km/h |

It should be noted that each numerical value in Table 12 is for example only, and it can be other values, and the disclosure is not limited thereto.

Type 1-3: beam related support capability corresponding to UE high speed capability. Especially, for a UE supporting high speed mobility, it is not excluded to introduce the following indication about beam support capability. The followings are just examples of the beam related support capability.

In one example, according to the enquiry of the network side, a UE reports whether the device can simultaneously receive and/or measure beams with different/multiple RX beam directions within the same frequency range and/or on the same carrier frequency.

In one example, according to the enquiry of the network side, UE reports whether the device can simultaneously transmit beams with different/multiple TX beam directions within the same frequency range and/or on the same carrier frequency.

In one example, according to the enquiry of the network side, UE reports whether the device can simultaneously receive and/or measure beams with different/multiple RX beam and/or simultaneously transmit beams with different/multiple TX beam directions within the same carrier frequency and/or on the same carrier frequency.

Therefore, as mentioned above, the network side may obtain the following UE capability and operating state, containing the following one or more kinds of information:

(1) UE power class information (the aforementioned Type 1-1), which can indirectly indicate the RF requirements such as UE EIRP spherical coverage, EIS spherical coverage and beam correspondence, which could be update on the existing RF requirements with respect for the high speed moving mode of UE, or newly defined for the high speed moving mode of UE dedicated to high speed communication of UE;

(2) HST capability indication of the UE (the aforementioned Type 1-2), which may include the maximum moving speed supported by the UE; and (3) Beam related support capability of the UE (the aforementioned Type 1-3).

Continuing with FIG. 4, in step 420, the UE may receive configuration information corresponding to the high speed capability of the UE determined based on the high speed capability information of the UE from the network-side entity. The network side may determine configuration information for restriction and/or adjustment on network configuration with respect to the UE situation (for example, the UE capability information) according to the UE capability and/or the UE movement mode detected by the network side (or autonomously reported by the UE) and/or the current network configuration, limits and/or adjusts the network configuration at the network side based on the configuration information, and transmits the configuration information to the UE to inform the UE of the limitation and/or adjustment network configuration and the UE movement mode, in order for the UE to perform corresponding operations based on the configuration information, for example, adjusting its own beam detection configuration according to the configuration information of the network; limiting the number of beams to be detected; and shortening the measurement period and reporting period, so as to ensure network connection and communication quality under a situation of high speed movement.

The configuration information according to the present disclosure can include the following types (Type 2-1, Type 2-2, and Type 2-3). It should be noted that although several limiting factors are illustrated separately, several limiting conditions can be adjusted separately or independently. However, for the convenience of illustration, each example is given separately, and the examples can be applied to the same parameter limiting considerations:

(1) Type 2-1: limitation information corresponding to UE high speed capability, including but not limited to the following Types 2-1-1, 2-1-2, and 2-1-3; and (2) Type 2-1-1: DRX cycle configuration limitation, specifically, some long DRX cycles can't be configured for different speeds, because considering a normal cell radius and moving speed, it may cause that if a long DRX cycle is configured within a certain cell range, the UE can't complete a necessary measurement process in the current cell within a specified period of time. This situation includes but is not limited to that, in a serving cell measurement and a measurement of intra-frequency NR cells of RRC_IDLE/INACTIVE state mobility, if different UE moving speeds and cell radii covered by base stations are considered, there may be different limitations for different speeds as follows: taking measurement and evaluation of serving cells in RRC_IDLE state mobility as an example, the network side provides limitation according to a detected UE moving speed and cell coverage, as shown in Table 13 below.

The UE may measure the SS-RSRP and SS-RSRQ level of the serving cell and evaluate the cell selection criterion S for the serving cell at least once every M1*N1 DRX cycle; where: M1=2 if SMTC periodicity (TSMTC)>20 ms and DRX cycle≤0.64 second, otherwise M1=1.

The UE may filter the SS-RSRP and SS-RSRQ measurements of the serving cell using at least 2 measurements. Within the set of measurements used for the filtering, at least two measurements may be spaced by, at least DRX cycle/2.

If the UE has evaluated according to Table 13 in Nserv consecutive DRX cycles that the serving cell does not fulfil the cell selection criterion S, the UE may initiate the measurements of all neighbor cells indicated by the serving cell, regardless of the measurement rules currently limiting UE measurement activities.

If the UE in RRC_IDLE has not found any new suitable cell based on searches and measurements using the intra-frequency, inter-frequency and inter-RAT information indicated in the system information for 10 s, the UE may initiate cell selection procedures for the selected PLMN.

TABLE 13

| DRX cycle length [sec] | Scaling factor (N1) | | $N_{serv}$ [Number of DRX cycles] |
|---|---|---|---|
| | FR1 | FR2[Note1] | |
| 0.32 | 1 | 8 | M1 * N1 * 4 |
| 0.64 | | 5 | M1 * N1 * 4 |
| 1.28 (Note 2) | | 4 | N1 * 2 |
| 2.56 (Note 2) | | 3 | N1 * 2 |

Note 1:
Applies for UE supporting power class 2&3&4. For UE supporting power class 1 or 5, N1 = 8 for all DRX cycle length.
Note 2:
Requirement for this DRX cycle may not be considered for FR2 UE in [certain HST mode_speed-cell range]
Note 3:
For FR2 UE with Highspeed capability and configured with FR2 Highspeedmea flag, N1 = 1, M1 = 1.

Limitation of configuring DRX cycle by the network may be as follows, but it is not limited thereto, and is also related to cell coverage.

| HST speed | Inapplicable DRX cycle [sec] |
|---|---|
| 252 km/h (69 m/s) | 2.56 |
| 350 km/h (97 m/s) | [1.28], 2.56 |
| 500 km/h (139 m/s) | 1.28, 2.56 |

Taking measurement of intra-frequency NR cells in RRC_IDLE state as an example, the network side provides limitation according to a detected UE moving speed and cell coverage, as shown in the following Tables 14 and 15.

The UE may be able to identify new intra-frequency cells and perform SS-RSRP and SS-RSRQ measurements of the identified intra-frequency cells without an explicit intra-frequency neighbor list containing physical layer cell identities.

The UE may be able to evaluate whether a newly detectable intra-frequency cell meets the reselection criteria within Tdetect,NR_Intra when that Treselection=0. An intra frequency cell is considered to be detectable according to the conditions for a corresponding Band.

The UE may measure SS-RSRP and SS-RSRQ at least every $T_{measure,NR\_Intra}$ (see table 14 or table 15) for intra-frequency cells that are identified and measured according to the measurement rules.

The UE may filter SS-RSRP and SS-RSRQ measurements of each measured intra-frequency cell using at least 2 measurements. Within the set of measurements used for the filtering, at least two measurements may be spaced by at least $T_{measure,NR\_Intra}/2$.

The UE may not consider a NR neighbor cell in cell reselection if it is indicated as not allowed in the measurement control system information of the serving cell.

For an intra-frequency cell that has been already detected, but that has not been reselected to, the filtering may be such that the UE may be capable of evaluating that the intra-frequency cell has met reselection criterion defined within Tevaluate,NR_Intra when Treselection=0 as specified in table 14 or table 15 provided that, when rangeToBestCell is not configured, the cell is at least 3 dB better ranked in FR1 or 4.5 dB better ranked in FR2;

when rangeToBestCell is configured:

the cell has the highest number of beams above the threshold absThreshSS-BlocksConsolidation among all detected cells whose cell-ranking criterion R value is within rangeToBestCell of the cell-ranking criterion R value of the highest ranked cell;

if there are multiple such cells, the cell has the highest rank among them; and the cell is at least 3 dB better ranked in FR1 or 4.5 dB better ranked in FR2 if the current serving cell is among them.

When evaluating cells for reselection, the SSB side conditions apply to both serving and non-serving intra-frequency cells.

If Treselection timer has a non-zero value and the intra-frequency cell is satisfied with the reselection criteria, the UE may evaluate this intra-frequency cell for the Treselection time. If this cell remains satisfied with the reselection criteria within this duration, then the UE may reselect that cell.

For UE not configured with highSpeedMeasFlag-r16 or FR2_highSpeedMeasFlag, $T_{detect,NR\_Intra}$, $T_{measure,NR\_Intra}$ and $T_{evaluate,\ NR\_intra}$ are specified in Table 14. For UE configured with highSpeedMeasFlag-r16 or FR2_highSpeedMeasFlag, $T_{detect,NR\_Intra}$, $T_{measure,NR\_Intra}$ and $T_{evaluate,NR\_intra}$ are specified in Table 15.

TABLE 14

$T_{detect\_NR\_Intra}$, $T_{measure\_NR\_Intra}$ and $T_{evaluate\_NR\_Intra}$

| DRX cycle length [s] | Scaling factor (N1) FR1 | Scaling factor (N1) FR2 Note 1 | $T_{detect\_NR\_Intra}$ [s] (number of DRX cycles) | $T_{measure\_NR\_Intra}$ [s] (number of DRX cycles) | $T_{evaluate\_NR\_Intra}$ [s] (number of DRX cycles) |
|---|---|---|---|---|---|
| 0.32 | 1 | 8 | 11.52 * N1 * M2 (36 * N1 * M2) | 1.28 * N1 * M2 (4 * N1 * M2) | 5.12 * N1 * M2 (16 * N1 * M2) |
| 0.64 | | 5 | 17.92 * N1 (28 * N1) | 1.28 * N1 (2 * N1) | 5.12 * N1 (8 * N1) |
| 1.28 | | 4 | 32 * N1 (25 * N1) | 1.28 * N1 (1 * N1) | 6.4 * N1 (5 * N1) |
| 2.56 | | 3 | 58.88 * N1 (23 * N1) | 2.56 * N1 (1 * N1) | 7.68 * N1 (3 * N1) |

Note 1:
Applies for UE supporting power class 2&3&4. For UE supporting power class 1 or 5, N1 = 8 for all DRX cycle length.
Note 2:
M2 = 1.5 if SMTC periodicity of measured intra-frequency cell > 20 ms; otherwise M2 = 1.

TABLE 15

$T_{detect\_NR\_Intra}$, $T_{measure\_NR\_Intra}$ and $T_{evaluate\_NR\_Intra}$ for a UE Configured with highSpeedMeasFlag-r16 (Frequency Range FR1) and FR2_highSpeedMeasFlag (Frequency Range FR2)

| DRX cycle length [s] | $T_{detect\_NR\_Intra}$ [s] (number of DRX cycles) | $T_{measure\_NR\_Intra}$ [s] (number of DRX cycles) | $T_{evaluate\_NR\_Intra}$ [s] (number of DRX cycles) |
|---|---|---|---|
| 0.32 | 2.56 * M2 (8 * M2) | 0.32 * M3 (1 * M3) | 0.96 * M4 (3 * M4) |
| 0.64 | 5.12 (8) | 0.64 (1) | 1.92 (3) |
| 1.28 | 8.96 (7) | 1.28 (1) | 3.84 (3) |
| 2.56 | 58.88 (23) | 2.56 (1) | 7.68 (3) |

Note 1:
When SMTC <= 40 ms, M2 = M3 = M4 = 1; and when SMTC > 40 ms, M2 = 1.5, M3 = M4 = 2.

This limitation may be reflected in all requirements related to the DRX cycle, and it is not excluded that additional notes should be added in the specification to explain which DRX cycles are not suitable for a situation in which measurement is needed in a high speed state.

Type 2-1-2: SSB periodicity limitation. Specifically, some long SSB periodicity cannot be configured for different speeds, because considering a common cell radius and moving speed, it may cause that if a long SSB periodicity is configured within a certain cell range, the UE cannot complete a specified necessary measurement and/or reporting process within a specified period of time. This situation includes but is not limited to SSB-based radio link monitoring (RLM), link recovery delay-SSB-based beam failure detection (BFD), link recovery delay-SSB-based candidate beam detection (CBD) and related measurement reporting.

Taking the SSB-based RLM as an example, the evaluation time in an evaluation period is restricted by many factors. As configuration of a long DRX cycle is limited as mentioned before, evaluation times of other situations are related to the SSB periodicity TSSB, and the network side needs to decide an appropriate SSB periodicity setting by combining relevant information such as cell coverage, UE moving speed and its beam support capability, as shown in Table 16 below.

TABLE 16

Evaluation periods $T_{Evaluate\_out\_SSB}$ and $T_{Evaluate\_in\_SSB}$ for FR2

| Configuration | $T_{Evaluate\_out\_SSB}$ (ms) | $T_{Evaluate\_in\_SSB}$ (ms) |
|---|---|---|
| Non-DRX | Max (200, Ceil (10 × P × N) × $T_{SSB}$) | Max (100, Ceil (5 × P × N) × $T_{SSB}$) |
| DRX cycle ≤320 ms | Max (200, Ceil (15 × P × N) × Max ($T_{DRX}$, $T_{SSB}$)) | Max (100, Ceil (7.5 × P × N) × Max ($T_{DRX}$, $T_{SSB}$)) |
| DRX cycle >320 ms | Ceil (10 × P × N) × $T_{DRX}$ | Ceil (5 × P × N) × $T_{DRX}$ |

Note:
$T_{SSB}$ is the periodicity of SSB configured for RLM. $T_{DRX}$ is the DRX cycle length.

For the SSB-based beam failure detection, the network side also needs to decide an appropriate SSB periodicity setting, as shown in Table 17 below.

TABLE 17

Evaluation period $T_{Evaluate\_BFD\_SSB}$ for FR2

| Configuration | $T_{Evaluate\_BFD\_SSB}$ (ms) |
|---|---|
| Non-DRX | Max (50, Ceil (5 × P × N) × $T_{SSB}$) |
| DRX cycle ≤320 ms | Max (50, Ceil (7.5 × P × N) × Max ($T_{DRX}$, $T_{SSB}$)) |
| DRX cycle >320 ms | Ceil (5 × P × N) × $T_{DRX}$ |

Note:
$T_{SSB}$ is the periodicity of SSB in set $\bar{q}_0$. $T_{DRX}$ is the DRX cycle length.

For the SSB-based candidate beam detection, the network side also needs to decide an appropriate SSB periodicity setting, as shown in Table 18 below.

TABLE 18

Evaluation period $T_{Evaluate\_CBD\_SSB}$ for FR2

| Configuration | $T_{Evaluate\_CBD\_SSB}$ (ms) |
|---|---|
| Non-DRX, DRX cycle ≤320 ms | Max (25, Ceil (3 × P × N × $P_{CBD}$) × $T_{SSB}$) |
| DRX cycle >320 ms | Ceil (3 × P × N × $P_{CBD}$) × $T_{DRX}$ |

Note:
$T_{SSB}$ is the periodicity of SSB in set $\bar{q}_1$. $T_{DRX}$ is the DRX cycle length.

For SSB-based L1-RSRP reporting, the network side also needs to decide an appropriate SSB periodicity setting, as shown in Table 19 below.

TABLE 19

Measurement Period $T_{L1\text{-}RSRP\_Measurement\_Period\_SSB}$ for FR2

| Configuration | $T_{L1\text{-}RSRP\_Measurement\_Period\_SSB}$ (ms) |
|---|---|
| Non-DRX | Max ($T_{Report}$, ceil (M*P*N)*$T_{SSB}$) |
| DRX cycle ≤320 ms | Max ($T_{Report}$, ceil (1.5*M*P*N)*max ($T_{DRX}$, $T_{SSB}$)) |
| DRX cycle >320 ms | Ceil (1.5*M*P*N)*$T_{DRX}$ |

Note:
$T_{SSB}$ = ssb-periodicityServingCell is the periodicity of SSB-Index configured for L1-RSRP measurement. $T_{DRX}$ is the DRX cycle length. $T_{Report}$ is configured periodicity for reporting.

For SSB-based L1-RSRP measurement reporting, the network side also needs to decide an appropriate SSB periodicity setting, as shown in Table 20 below.

TABLE 20

Measurement Period $T_{L1\text{-}RSRP\_Measurement\_Period\_SSB}$ for FR2

| Configuration | $T_{L1\text{-}RSRP\_Measurement\_Period\_SSB}$ (ms) |
|---|---|
| Non-DRX | Max ($T_{Report}$, ceil (M*P*N)*$T_{SSB}$) |
| DRX cycle ≤320 ms | Max ($T_{Report}$, ceil (1.5*M*P*N)*max ($T_{DRX}$, $T_{SSB}$)) |
| DRX cycle >320 ms | ceil (1.5*M*P*N)*$T_{DRX}$ |

Note:
$T_{SSB}$ = ssb-periodicityServingCell is the periodicity of SSB-Index configured for L1-RSRP measurement. $T_{DRX}$ is the DRX cycle length. $T_{Report}$ is configured periodicity for reporting.

For SSB-based L1-SINR measurement reporting, the network side also needs to decide an appropriate SSB periodicity setting, as shown in Table 21 below.

TABLE 21

Measurement Period $T_{L1\text{-}SINR\_Measurement\_Period\_SSB\_CMR\_IMR}$ for FR2

| Configuration | $T_{L1\text{-}SINR\_Measurement\_Period\_SSB\_CMR\_IMR}$ (ms) |
|---|---|
| Non-DRX | max ($T_{Report}$, ceil(M*P*N)*$T_{SSB}$) |
| DRX cycle ≤320 ms | max ($T_{Report}$, ceil (1.5*M*P*N)*max ($T_{DRX}$, $T_{SSB}$)) |
| DRX cycle >320 ms | ceil (1.5*M*P*N)*$T_{DRX}$ |

Note 1:
$T_{SSB}$ = ssb-periodicityServingCell is the periodicity of SSB-index configured for L1-SINR measurement. $T_{DRX}$ is the DRX cycle length. $T_{Report}$ is configured periodicity for reporting.
Note 2:
The requirements are applicable provided that the CSI-RS resource configured for interference measurement may be 1-to-1 mapped to SSB configured for channel measurement, with the same periodicity.

Type 2-1-3: CSI-RS periodicity limitation. Specifically, some long CSI-RS cycles can't be configured for different speeds, because considering a common cell radius and moving speed, it may cause that if a long CSI-RS cycle is configured within a certain cell range, the UE can't complete a specified necessary measurement and/or reporting process within a specified period of time. This situation includes but is not limited to CSI-RS-based RLM, link recovery delay-CSI-RS-based beam failure detection, link recovery delay-CSI-RS-based CBD and related measurement reporting.

Taking the CSI-RS-based RLM as an example, an evaluation time in an evaluation period is restricted by many factors. Because the long DRX cycle is limited as described above, evaluation times of other situations are related to the CSI-RS periodicity TCSI-RS configured for RLM measurement, and the network side needs to decide an appropriate CSI-RS periodicity setting by combining relevant information such as cell coverage, UE moving speed and its beam support capability, as shown in Table 22 below.

TABLE 22

Evaluation periods $T_{Evaluate\_out\_CSI\text{-}RS}$ and $T_{Evaluate\_out\_CSI\text{-}RS}$ for FR2

| Configuration | $T_{Evaluate\_out\_CSI\text{-}RS}$ (ms) | $T_{Evaluate\_in\_CSI\text{-}RS}$ (ms) |
|---|---|---|
| Non-DRX | Max (200, Ceil ($M_{out}$ × P × N) × $T_{CSI\text{-}RS}$) | Max (100, Ceil ($M_{in}$ × P × N) × $T_{CSI\text{-}RS}$) |
| DRX cycle ≤320 ms | Max (200, Ceil (1.5 × $M_{out}$ × P × N) × Max ($T_{DRX}$, $T_{CSI\text{-}RS}$)) | Max (100, Ceil (1.5 × $M_{in}$ × P × N) × Max ($T_{DRX}$, $T_{CSI\text{-}RS}$)) |
| DRX cycle >320 ms | Ceil ($M_{out}$ × P × N) × $T_{DRX}$ | Ceil ($M_{in}$ × P × N) × $T_{DRX}$ |

Note:
$T_{CSI\text{-}RS}$ is the periodicity of CSI-RS resources configured for RLM. The requirements in this table apply for $T_{CSI\text{-}RS}$ equal to 5 ms, 10 ms, 20 ms or 40 ms. $T_{DRX}$ is the DRX cycle length.

For the link recovery delay-CSI-RS-based beam failure detection, the network side also needs to decide an appropriate CSI-RS periodicity setting, as shown in Table 23 below.

TABLE 23

Evaluation period $T_{Evaluate\_BFD\_CSI\text{-}RS}$ for FR2

| Configuration | $T_{Evaluate\_BFD\_CSI\text{-}RS}$ (ms) |
|---|---|
| Non-DRX | Max (50, [$M_{BFD}$ × P × N × $P_{BFD}$] × $T_{CSI\text{-}RS}$) |
| DRX cycle ≤320 ms | Max (50, [1.5 × $M_{BFD}$ × P × N × $P_{BFD}$] × Max ($T_{DRX}$, $T_{CSI\text{-}RS}$)) |
| DRX cycle >320 ms | [$M_{BFD}$ × P × N × $P_{BFD}$] × $T_{DRX}$ |

Note:
$T_{CSI\text{-}RS}$ is the periodicity of CSI-RS resources in set $\bar{q}_0$. $T_{DRX}$ is the DRX cycle length.

For the link recovery delay-CSI-RS-based CBD, the network side also needs to decide an appropriate CSI-RS periodicity setting, as shown in Table 24 below.

TABLE 24

Evaluation period $T_{Evaluate\_CBD\_CSI\text{-}RS}$ for FR2

| Configuration | $T_{Evaluate\_CBD\_CSI\text{-}RS}$ (ms) |
|---|---|
| Non-DRX, DRX cycle ≤320 ms | Max (25, Ceil ($M_{CBD}$ × P × N × $P_{CBD}$) × $T_{CSI\text{-}RS}$) |
| DRX cycle >320 ms | Ceil ($M_{CBD}$ × P × N × $P_{CBD}$) × $T_{DRX}$ |

Note:
$T_{CSI\text{-}RS}$ is the periodicity of CSI-RS resources in set $\bar{q}_1$. $T_{DRX}$ is the DRX cycle length.

For CSI-RS-based L1-RSRP measurement reporting, the network side also needs to decide an appropriate CSI-RS periodicity setting, as shown in Table 25 below.

TABLE 25

Measurement Period $T_{L1\text{-}RSRP\_Measurement\_Period\_CSI\text{-}RS}$ for FR2

| Configuration | $T_{L1\text{-}RSRP\_Measurement\_Period\_CSI\text{-}RS}$ (ms) |
|---|---|
| Non-DRX | max ($T_{Report}$, ceil (M*P*N)*$T_{CSI\text{-}RS}$) |
| DRX | Max ($T_{Report}$, ceil (1.5*M*P*N)*max |

TABLE 25-continued

Measurement Period $T_{L1\text{-}RSRP\_Measurement\_Period\_CSI\text{-}RS}$ for FR2

| Configuration | $T_{L1\text{-}RSRP\_Measurement\_Period\_CSI\text{-}RS}$ (ms) |
|---|---|
| cycle ≤320 ms | $(T_{DRX}, T_{CSI\text{-}RS}))$ |
| DRX | |
| DRX cycle >320 ms | $ceil(M*P*N)*T_{DRX}$ |

Note 1:
$T_{CSI\text{-}RS}$ is the periodicity of CSI-RS configured for L1-RSRP measurement. $T_{DRX}$ is the DRX cycle length. $T_{Report}$ is configured periodicity for reporting.
Note 2:
the requirements are applicable provided that the CSI-RS resource configured for L1-RSRP measurement is transmitted with Density = 3.

For CSI-RS-based L1-SINR measurement reporting, the network side also needs to decide an appropriate CSI-RS periodicity setting, as shown in Table 26 or Table 27 below.

TABLE 26

Measurement Period $T_{L1\text{-}SINR\_Measurement\_Period\_CSI\text{-}RS\_CMR\_Only}$ for FR2

| Configuration | $T_{L1\text{-}SINR\_Measurement\_Period\_CSI\text{-}RS\_CMR\_Only}$ (ms) |
|---|---|
| Non-DRX | max $(T_{Report}, ceil\ (M*P*N)*T_{CSI\text{-}RS})$ |
| DRX cycle ≤320 ms | Max $(T_{Report}, ceil\ (1.5*M*P*N)*max\ (T_{DRX}, T_{CSI\text{-}RS}))$ |
| DRX cycle >320 ms | $ceil(M*P*N)*T_{DRX}$ |

Note 1:
$T_{CSI\text{-}RS}$ is the periodicity of CSI-RS configured for L1-SINR measurement. $T_{DRX}$ is the DRX cycle length. $T_{Report}$ is configured periodicity for reporting.
Note 2:
the requirements are applicable provided that the CSI-RS resource configured for L1-SINR measurement is transmitted with Density = 3.

TABLE 27

Measurement Period $T_{L1\text{-}SINR\_Measurement\_Period\_CSI\text{-}RS\_CMR\_IMR}$ for FR2

| Configuration | $T_{L1\text{-}SINR\_Measurement\_Period\_CSI\text{-}RS\_CMR\_IMR}$ (ms) |
|---|---|
| Non-DRX | max $(T_{Report}, ceil\ (M*P*N)*T_{CSI\text{-}RS})$ |
| DRX cycle ≤320 ms | max $(T_{Report}, ceil\ (1.5*M*P*N)*max\ (T_{DRX}, T_{CSI\text{-}RS}))$ |
| DRX cycle >320 ms | Ceil $(M*P*N)*T_{DRX}$ |

Note 1:
$T_{CSI\text{-}RS}$ is the periodicity of CSI-RS configured for L1-SINR measurement. $T_{DRX}$ is the DRX cycle length. $T_{Report}$ is configured periodicity for reporting.
Note 2:
the requirements are applicable provided that the CSI-RS resource configured for L1-SINR measurement is transmitted with Density = 3.
Note 3:
The requirements are applicable provided that the CSI-RS resource configured for interference measurement may be 1-to-1 mapped to CSI-RS configured for channel measurement, with the same periodicity.

For CSI-RS-based L3-SINR measurement reporting, the network side also needs to decide an appropriate CSI-RS periodicity setting, as shown in Table 28 below.

TABLE 28

Measurement period for intra-frequency CSI-RS-based gapless measurement (frequency FR2)

| DRX cycle | $T_{CSI\text{-}RS\_measurement\_period\_intra}$ |
|---|---|
| No DRX | max (400 ms, ceil $(M_{meas\_period\_w/o\_gaps} \times K_p) \times$ CSI-RS period) * $CSSF_{intra}$ |
| DRX cycle ≤320 ms | Max (400 ms, ceil $(1.5*M_{meas\_period\_w/o\_gaps} * K_p)$ * max (CSI-RS period, DRX cycle)) * $CSSF_{intra}$ |
| DRX cycle >320 ms | $M_{meas\_period\_w/o\_gaps}$ * DRX cycle * $CSSF_{intra}$ |

Note 1:
These requirements apply assuming CSI-RS configuration with {D = 3, PRB ≥ 48}. D is the frequency domain density of 1-port CSI-RS for L3 mobility.

By receiving the above-mentioned limitation information of Type 2-1 from the network side, the UE can adjust its own configuration to ensure network connection and communication quality in the condition of high speed movement.

Type 2-2: downlink beam measurement and detection reporting level information corresponding to UE high speed capability for RRM. Specifically, when the moving speed of a target UE is higher, there may be fewer candidate beams to be configured for downlink beam measurement and detection, and the measurement times may be correspondingly reduced, and the configured periodicity for reporting ($T_{Report}$) may also be shortened. Specifically, the applicability of some measurement time scaling factor also needs to be adjusted to adapt to the characteristics of high speed mobility and meet a goal of seamless handover.

For example, for FR2 in a normal mobile scenario, generally the UE monitors 8 beam directions by default, which is reflected in a scaling factor N=8 defined for FR2, or additional scaling factors are defined for certain periodicity conditions, which can be additionally configured and informed to the UE according to its own situation in the high speed mobile scenario, as shown in Tables 29-32 below. Specifically, this kind of information can be distributed in combination with the limitation information of Type 2-1.

TABLE 29

Evaluation periods $T_{Evaluate\_out\_SSB}$ and $T_{Evaluate\_in\_SSB}$ for FR2

| Configuration | $T_{Evaluate\_out\_SSB}$ (ms) | $T_{Evaluate\_in\_SSB}$ (ms) |
|---|---|---|
| No DRX | Max (200, Ceil $(10 \times P \times N) \times T_{SSB})$ | Max (100, Ceil $(5 \times P \times N) \times T_{SSB})$ |
| DRX cycle ≤320 ms | Max (200, Ceil $(15 \times P \times N) \times$ Max $(T_{DRX}, T_{SSB}))$ | Max (100, Ceil $(7.5 \times P \times N) \times$ Max $(T_{DRX}, T_{SSB}))$ |
| DRX cycle >320 ms | Ceil $(10 \times P \times N) \times T_{DRX}$ | Ceil $(5 \times P \times N) \times T_{DRX}$ |

Note:
$T_{SSB}$ is the periodicity of the SSB configured for RLM. $T_{DRX}$ is the DRX cycle length.

TABLE 30

Evaluation periods $T_{Evaluate\_out\_CSI\text{-}RS}$ and $T_{Evaluate\_in\_CSI\text{-}RS}$ for FR2

| Configuration | $T_{Evaluate\_out\_CSI\text{-}RS}$ (ms) | $T_{Evaluate\_in\_CSI\text{-}RS}$ (ms) |
|---|---|---|
| No DRX | Max (200, Ceil $(M_{out} \times P \times N) \times T_{CSI\text{-}RS})$ | Max (100, Ceil $(M_{in} \times P \times N) \times T_{CSI\text{-}RS})$ |
| DRX cycle ≤320 ms | Max (200, Ceil $(1.5\ M_{out} \times P \times N) \times$ Max $(T_{DRX}, T_{CSI\text{-}RS}))$ | Max (100, Ceil $(1.5 \times M_{in} \times P \times N) \times$ Max $(T_{DRX}, T_{CSI\text{-}RS}))$ |
| DRX cycle >320 ms | Ceil $(M_{out} \times P \times N) \times T_{DRX}$ | Ceil $(M_{in} \times P \times N) \times T_{DRX}$ |

Note:
$T_{CSI\text{-}RS}$ is the periodicity of the CSI-RS resources configured for RLM. The requirements in this table apply for $T_{CSI\text{-}RS}$ equal to 5 ms, 10 ms, 20 ms or 40 ms. $T_{DRX}$ is the DRX cycle length.

TABLE 31

Measurement Period $T_{L1\text{-}RSRP\_Measurement\_Period\_SSB}$ for FR2

| Configuration | $T_{L1\text{-}RSRP\_Measurement\_Period\_SSB}$ (ms) |
|---|---|
| Non-DRX | max ($T_{Report}$, ceil (M*P*N)*$T_{SSB}$) |
| DRX cycle ≤320 ms | max ($T_{Report}$, ceil (1.5*M*P*N)*max ($T_{DRX}$,$T_{SSB}$)) |
| DRX cycle >320 ms | ceil (1.5*M*P*N)*$T_{DRX}$ |

Note:
$T_{SSB}$ = ssb-periodicityServingCell is the periodicity of SSB-index configured for L1-RSRP measurement. $T_{DRX}$ is the DRX cycle length. $T_{Report}$ is configured periodicity for reporting.

TABLE 32

Measurement Period $T_{L1\text{-}RSRP\_Measurement\_Period\_CSI\text{-}RS}$ for FR2

| Configuration | $T_{L1\text{-}RSRP\_Measurement\_Period\_CSI\text{-}RS}$ (ms) |
|---|---|
| Non-DRX | max ($T_{Report}$, ceil (M*P*N)*$T_{CSI\text{-}RS}$) |
| DRX cycle ≤320 ms | max ($T_{Report}$, ceil (1.5*M*P*N)*max ($T_{DRX}$, $T_{CSI\text{-}RS}$)) |
| DRX cycle >320 ms | ceil (M*P*N)*$T_{DRX}$ |

Note 1:
$T_{CSI\text{-}RS}$ is the periodicity of CSI-RS configured for L1-RSRP measurement. $T_{DRX}$ is the DRX cycle length. $T_{Report}$ is configured periodicity for reporting.
Note 2:
the requirements are applicable provided that the CSI-RS resource configured for L1-RSRP measurement is transmitted with Density = 3.

By receiving the above-mentioned radio resource management downlink beam measurement and detection reporting level information of Type 2-2 from the network side, the UE can adjust its own configuration to ensure network connection and communication quality in the condition of high speed movement.

Type 2-3: High speed operating mode information, in order for the UE to adjust its operating mode to a high speed state, improve more targeted and efficient mobility measurement in a high speed moving state, improve efficiency and ensure communication quality. The high speed operating mode information that the UE can obtain from the network side includes but is not limited to the following:

High speed network deployment type: unidirectional single-beam network;

High speed network deployment type: bi-directional single-beam (per panel) network;

High speed network deployment type: bi-directional multi-beam (per panel) coverage network;

High speed network deployment type: other optimized types (complicated situations reserved for such as tunnels or viaduct crossings);

High speed network assistance information, including but not limited to information on cells along a track, moving speed range;

Measurement time scaling factor; and

Information indicating inapplicable scenarios or processes.

Type 2-2, that is, radio resource management downlink beam measurement and detection reporting level information, has been described before. Specifically, when the moving speed of a target UE is higher, there may be fewer candidate beams to be configured for downlink beam measurement and detection, and the measurement times may be correspondingly reduced, and the configured periodicity for reporting (TReport) may also be shortened. Specifically, the applicability of some measurement time scaling factor also needs to be adjusted to adapt to the characteristics of high speed mobility and meet a goal of seamless handover. For example, generally N=8 is defined for FR2 in a normal mobile scenario, this value may not be too large for a high speed train scenario, and may be reduced according to the scenario.

In addition, Type 2-1 has been described before, and as mentioned before, configuration and applications of some DRX cycle, SSB periodicity and CSI-RS periodicity may also be limited according to the moving speed of the UE. In addition, proportionality coefficients (scaling factors, such as P and M) used in some measurements may be specially defined to be appropriate values for the high speed train scenario, and specific additional proportionality coefficients (scaling factors) may be designed for the high speed train scenario as well. Type 2-2 related information may be distributed in combination with information in Type 2-3. This principle is applicable to all the aforementioned SSB-based cell measurements, beam measurements, L1-SRSP, L1-SINR measurement reporting and all CSI-RS-based cell measurements, beam measurements, L1-RSRP, L1-SINR and L3-RSRP reporting. The following takes the SSB-based L1-RSRP measurement reporting as an example, but it is also applicable to other measurement and/or reporting requirements.

In order to support a normal operation of HST, it may be necessary to add new notes or give explanation in the text. The following takes notes for example, but not limited thereto, as shown in Table 33 below.

TABLE 33

Measurement Period $T_{L1\text{-}RSRP\_Measurement\_Period\_SSB}$ for FR2

| Configuration | $T_{L1\text{-}RSRP\_Measurement\_Period\_SSB}$ (ms) |
|---|---|
| Non-DRX | max ($T_{Report}$, ceil (M*P*N)*$T_{SSB}$) |
| DRX cycle ≤320 ms | Max ($T_{Report}$, ceil (1.5*M*P*N)*max ($T_{DRX}$, $T_{SSB}$)) |
| DRX cycle >320 ms | Ceil (1.5*M*P*N)*$T_{DRX}$ |

Note 1:
$T_{SSB}$ = ssb-periodicityServingCell is the periodicity of the SSB-Index configured for L1-RSRP measurement. $T_{DRX}$ is the DRX cycle length. $T_{Report}$ is configured periodicity for reporting.
Note 2:
For UE with [FR2 HST capability] configured with [FR2_HSTMeaFlag], N is 1 or indicated separately.

It should be noted that values of the formulas and parameters in the above tables are for example only, and may also be other formulas and values, which are not limited by the present disclosure.

Alternatively, as mentioned above, an additional proportionality coefficient (scaling factor) for measurement time can be specially introduced for the high speed train scenario (HST). After receiving a notification of high speed operating mode from the network side, the UE automatically adjusts (e.g., reduces) the measurement time according to the additional proportionality coefficient (scaling factor) according to a ratio corresponding to the additional proportionality coefficient (scaling factor), in which the ratio may be fixed or not. For example, the UE may use corresponding additional proportionality coefficients (scaling factors) for different UE speed ranges.

For a high speed train scenario, some scenarios or processes defined by the following radio resource management are no longer applicable, including but not limited to the following:

Handover from NR to other systems;
NR DAPS handover;
NR conditional handover;
MTTD and MRTD;
Requirements related to Scell, SUL, CA and ENDC in signalling indexes; and
NR measurement of automatic measurement gap.

By receiving the above-mentioned high speed operating mode information of Type 2-3 from the network side, the UE can adjust its own configuration to ensure network connection and communication quality under a situation of high speed movement.

Figure 5:
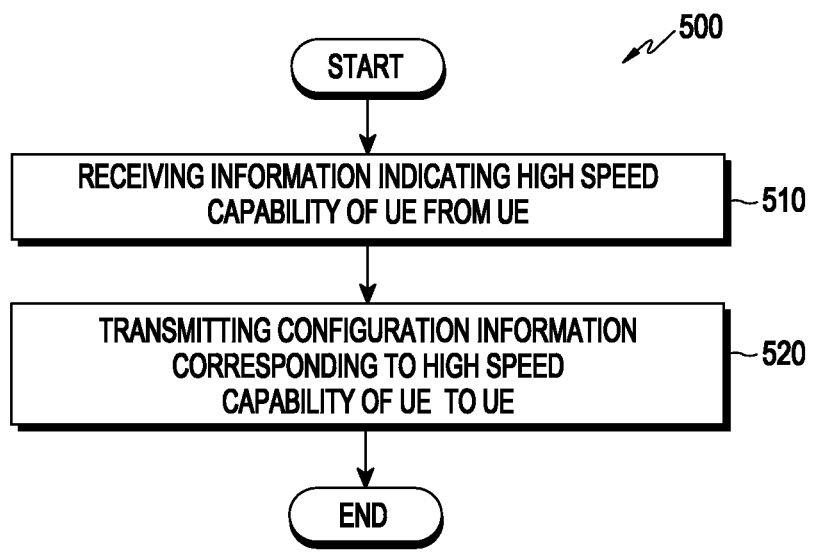
FIG. 5 illustrates a method performed by a network-side entity according to an embodiment of the present disclosure.

FIG. 5 illustrates a method performed by a network-side entity according to an embodiment of the present disclosure. The network-side entity may be the gNB 101 or 102 as shown in FIG. 1, but it is not limited thereto, and it may also be any other radio access network entity or core network entity.

At step 510, the network-side entity may receive information indicating a high speed capability of a UE from the UE. The information indicating the high speed capability of the UE has already been described in the description of step 410 in FIG. 4, and will not be repeated here.

At step 520, the network-side entity may transmit configuration information corresponding to the high speed capability of the UE to the UE. For example, the network-side entity can determine the configuration information corresponding to the high speed capability of the UE based on the information indicating the high speed capability of the UE when it is detected that the UE is in a high speed moving state. The configuration information has already been described in the description of step 420 in FIG. 4, and will not be described here.

Then, the network-side entity may make configuration at the network-side entity based on the configuration information. As mentioned above, the network side determines the configuration information for limiting and/or adjusting the network configuration with respect to the UE situation according to the UE capability and/or the UE movement detected by the network side or autonomously reported by the UE and/or the current network configuration, and limits and/or adjusts the network configuration at the network side based on the configuration information, so as to ensure network connection and communication quality under a situation of high speed movement.

Next, the network-side entity transmits the configuration information to the UE.

Figure 6:
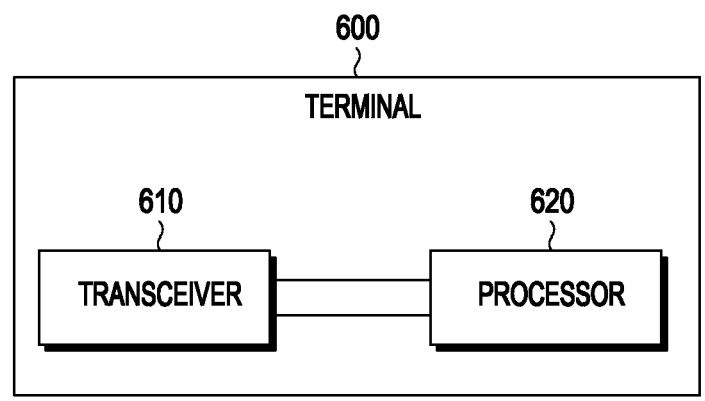
FIG. 6 is a block diagram illustrating a structure of a UE 600 according to an embodiment of the present disclosure.

FIG. 6 is a block diagram illustrating a structure of a UE 600 according to an embodiment of the present disclosure.

Referring to FIG. 6, the UE 600 includes a transceiver 610 and a processor 620. The transceiver 610 may be configured to transmit and receive signals. The processor 620 may be configured to control the transceiver 610 to transmit information indicating a high speed capability of the UE to a network-side entity; and control the transceiver 610 to receive configuration information corresponding to the high speed capability of the UE from the network-side entity. The UE 600 may be implemented in software, hardware, firmware or a combination thereof.

Figure 7:
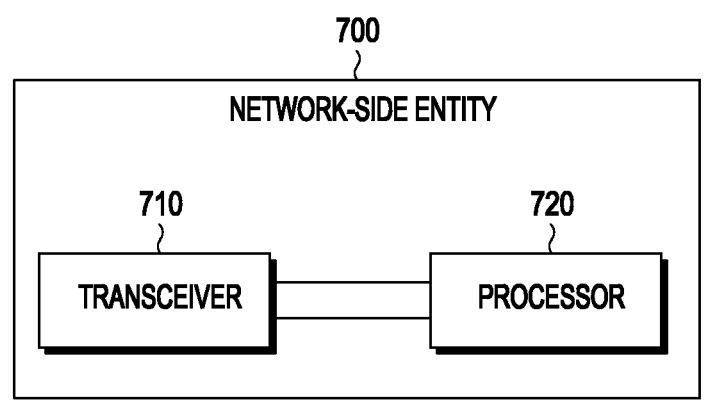
FIG. 7 is a block diagram illustrating a structure of a network-side entity 700 according to an embodiment of the present disclosure.

FIG. 7 is a block diagram illustrating a structure of a network-side entity 700 according to an embodiment of the present disclosure. Referring to FIG. 7, the network-side entity 700 includes a transceiver 710 and a processor 720. The transceiver 710 may be configured to transmit and receive signals. The processor 720 may be configured to control the transceiver 710 to receive information indicating a high speed capability of a user equipment (UE) from the UE; and control the transceiver 710 to transmit configuration information corresponding to the high speed capability of the UE to the UE. The network-side entity 700 may be implemented in software, hardware, firmware or a combination thereof.

According to an aspect of the present disclosure, there is provided a method performed by a user equipment (UE) in a wireless communication system, including: transmitting UE capability information to a network-side entity; and receiving configuration information determined based on the UE capability information from the network-side entity.

Optionally, the information indicating a high speed capability of the UE includes at least one of the followings: power class related information corresponding to the high speed capability of the UE, information related to indicating whether the UE supports high speed mobility, information related to the maximum moving speed supported by the UE, and information related to beam related support capability corresponding to the high speed capability of the UE.

Optionally, wherein the power class related information corresponding to the high speed capability of the UE indicates one or more of the followings: spherical coverage related information corresponding to the high speed capability of the UE, beam correspondence related information corresponding to the high speed capability of the UE, and information related to indicating whether the UE supports high speed mobility.

Optionally, wherein the spherical coverage related information corresponding to the high speed capability of the UE includes at least one of effective isotropic radiated power (EIRP) spherical coverage related information of the UE corresponding to the high speed capability of the UE and equivalent isotropic sensitivity (EIS) spherical coverage related information corresponding to the high speed capability of the UE.

Optionally, wherein the beam correspondence related information corresponding to the high speed capability of the UE includes one or more of the followings: tolerance requirement related information of autonomous beam correspondence corresponding to the high speed capability of the UE, side condition related information for autonomous beam correspondence for synchronization signal block and physical broadcast channel block (SSB)-based layer 1 (L1)-reference signal receiving power (RSRP) measurement corresponding to the high speed capability of the UE, and side condition related information for autonomous beam correspondence for channel state information-reference signal (CSI-RS)-based L1-RSRP measurement corresponding to the high speed capability of the UE.

Optionally, wherein the information related to beam support capability corresponding to the high speed capability of the UE includes one or more of the followings: capability of receiving and/or measuring beams with different/multiple RX beam directions and capability of transmitting beams with different/multiple TX beam directions.

Optionally, wherein the configuration information includes at least one of the following: limitation information corresponding to the high speed capability of the UE, information on fixing a bore sight direction of an antenna panel of the UE corresponding to the high speed capability of the UE, information on fixing an operating state of beam switching in a certain bore sight direction corresponding to the high speed capability of the UE, radio resource management downlink beam measurement and detection reporting level information corresponding to the high speed capability of the UE, and high speed operating mode information.

Optionally, wherein the limitation information corresponding to the high speed capability of the UE includes one or more of limitation information of discontinuous transmission (DRX) cycle, limitation information of synchronization signal block and physical broadcast channel block (SSB) periodicity and limitation information of channel state information-reference signal (CSI-RS) periodicity.

Optionally, wherein the high speed operating mode information includes one or more of the followings: high speed network deployment type, high speed network assistance information, information indicating scenarios or processes where high speed communication is unavailable, a measurement time scaling factor corresponding to the high speed capability of the UE, and an additional time scaling factor corresponding to the high speed capability of the UE.

Optionally, wherein the high speed network deployment type includes one or more of the followings: unidirectional single-beam network, bi-directional single-beam network and bi-directional multi-beam network.

Optionally, wherein the high speed network assistance information includes one or more of the followings: information on cells along a track, and a moving speed range.

Optionally, transmitting information indicating a high speed capability of the UE to a network-side entity includes: receiving a message for enquiry information of the high speed capability of the UE from the network-side entity; and transmitting information indicating the high speed capability of the UE to the network-side entity.

According to another aspect of the present disclosure, there is provided a method performed by a network-side entity in a wireless communication system, including: receiving information indicating a high speed capability of a user equipment (UE) from the UE; and transmitting configuration information corresponding to the high speed capability of the UE to the UE.

According to another aspect of the present disclosure, there is provided a UE in a wireless communication system, including: a transceiver configured to transmit and receive signals; and a processor configured to control the transceiver to transmit UE capability information to a network-side entity; and control the transceiver to receive configuration information determined based on the UE capability information from the network-side entity.

According to another aspect of the present disclosure, there is provided a network-side entity in a wireless communication system, including: a transceiver configured to transmit and receive signals; and a processor configured to control the transceiver to receive information indicating a high speed capability of a user equipment (UE) from the UE; and control the transceiver to transmit configuration information corresponding to the high speed capability of the UE to the UE.

Various embodiments of the present disclosure may be implemented as computer-readable codes embodied on a computer-readable recording medium from a specific perspective. The computer-readable recording medium is any data storage device that can store data readable by a computer system. Examples of the computer-readable recording medium may include read-only memory (ROM), random access memory (RAM), compact disk read-only memory (CD-ROM), magnetic tape, floppy disk, optical data storage device, carrier wave (e.g., data transmission via the Internet), and the like. Computer-readable recording media can be distributed by computer systems connected via a network, and thus computer-readable codes may be stored and executed in a distributed manner. Furthermore, functional programs, codes, and code segments for implementing various embodiments of the present disclosure can be easily explained by those skilled in the art to which the embodiments of the present disclosure are applied.

It will be understood that embodiments of the present disclosure may be implemented in hardware, software, or a combination of hardware and software. Software may be stored as program instructions or computer-readable codes executable on a processor on a non-transitory computer-readable medium. Examples of non-transitory computer-readable recording media include magnetic storage media (e.g., ROM, floppy disk, hard disk, etc.) and optical recording media (e.g., CD-ROM, digital video disk (DVD), etc.). The non-transitory computer-readable recording medium may also be distributed on computer systems coupled by a network, so that the computer-readable codes may be stored and executed in a distributed manner. The medium may be read by a computer, stored in a memory, and executed by a processor. The various embodiments may be implemented by a computer or a portable terminal including a controller and a memory, and the memory may be an example of a non-transitory computer-readable recording medium suitable for storing program (s) having instructions to implement the embodiments of the present disclosure. The present disclosure can be realized by a program having codes for specifically implementing the apparatus and method described in the claims, which is stored in a machine (or computer)-readable storage medium. The program may be electronically carried on any medium, such as a communication signal transmitted via a wired or wireless connection, and the present disclosure suitably includes equivalents thereof.

The above description is only specific embodiments of the present disclosure, but the protection scope of the present disclosure is not limited to this. Any person familiar with this art can make various changes or substitutions within the technical scope disclosed in the present disclosure, and these changes or substitutions should be covered within the protection scope of the present disclosure. Therefore, the protection scope of the present disclosure shall be subject to the protection scope of the claims.

As above, embodiments of the present disclosure have been described in detail with reference to the accompanying drawings. However, specific structures are not limited to the above embodiments, and the present disclosure also includes any design changes that do not deviate from the gist of the present disclosure. In addition, various modifications can be made to the present disclosure within the scope of the claims, and embodiments obtained by properly combining the technical means disclosed in different embodiments are also included in the technical scope of the present disclosure. In addition, components with the same effect described in the above embodiments can be substituted for each other.

The above are only preferred embodiments of the present disclosure, and they are not intended to limit the present disclosure. Any modification, equivalent replacement, and improvement, etc. made within the spirit and principle of the present disclosure should be included in the scope of the present disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a wireless communication system, the method comprising:
   transmitting, to a network-side entity, UE capability information indicating a high speed capability of the UE; and
   receiving, from the network-side entity, configuration information associated with high speed of the UE,
   wherein the UE capability information includes power class information set to a specific value indicating that the UE is a high speed train (HST) roof-mounted UE type, and
   wherein the power class information indicates spherical coverage information including equivalent isotropic sensitivity (EIS) spherical coverage information corresponding to the HST roof-mounted UE type.

2. The method of claim 1, wherein the UE capability information indicating the high speed capability of the UE further comprises at least one of:
   information indicating whether the UE supports high speed mobility;
   information indicating a maximum moving speed supported by the UE; or information indicating beam related support capability corresponding to the high speed capability of the UE.

3. The method of claim 1, wherein the power class information indicates at least one of:
   beam correspondence information corresponding to the high speed capability of the UE; or information indicating whether the UE supports high speed mobility.

4. The method of claim 1, wherein the spherical coverage information further includes
   effective isotropic radiated power (EIRP) spherical coverage information of the UE corresponding to the high speed capability of the UE.

5. The method of claim 3, wherein the beam correspondence information corresponding to the high speed capability of the UE comprises at least one of:
   tolerance requirement information of autonomous beam correspondence corresponding to the high speed capability of the UE;
   side condition information for autonomous beam correspondence for a synchronization signal block and physical broadcast channel block (SSB)-based layer 1 (L1)-reference signal receiving power (RSRP) measurement corresponding to the high speed capability of the UE; or side condition information for autonomous beam correspondence for channel state information-reference signal (CSI-RS)-based L1-RSRP measurement corresponding to the high speed capability of the UE.

6. The method of claim 2, wherein the information indicating beam related support capability corresponding to the high speed capability of the UE comprises at least one of:
   capability of receiving and measuring beams with different RX beam directions; or
   capability of transmitting the beams with different TX beam directions.

7. The method of claim 1, wherein the configuration information comprises at least one of:
   limitation information corresponding to the high speed capability of the UE;
   information for fixing a bore sight direction of an antenna panel of the UE corresponding to the high speed capability of the UE;
   information for fixing an operating state of beam switching in a certain bore sight direction corresponding to the high speed capability of the UE;
   radio resource management downlink beam measurement and detection reporting level information corresponding to the high speed capability of the UE; and
   high speed operating mode information.

8. The method of claim 7, wherein the limitation information corresponding to the high speed capability of the UE comprises at least one of:
   limitation information of discontinuous transmission (DRX) cycle;
   limitation information of SSB periodicity; or
   limitation information of channel state information-reference signal (CSI-RS) periodicity.

9. The method of claim 7, wherein the high speed operating mode information comprises at least one of:
   a high speed network deployment type;
   high speed network assistance information;
   information indicating scenarios or processes where high speed communication is inapplicable;
   a measurement time scaling factor corresponding to the high speed capability of the UE; or
   an additional time scaling factor corresponding to the high speed capability of the UE.

10. The method of claim 9, wherein the high speed network deployment type comprises at least one of: a unidirectional single-beam network, a bi-directional single-beam network, or a bi-directional multi-beam network.

11. The method of claim 9, wherein the high speed network assistance information comprises at least one of: information on cells along a track, or information on a moving speed range.

12. The method of claim 1, further comprising:
   receiving, from the network-side entity, a message including information that requests the high speed capability of the UE.

13. A method performed by a network-side entity in a wireless communication system, the method comprising:
   receiving, from a user equipment (UE), UE capability information indicating a high speed capability of the UE; and
   transmitting, to the UE, configuration information associated with high speed of the UE,
   wherein the UE capability includes power class information set to a specific value indicating that the UE is a high speed train (HST) roof-mounted UE type, and
   wherein the power class information indicates spherical coverage information including equivalent isotropic sensitivity (EIS) spherical coverage information corresponding to the HST roof-mounted UE type.

14. A user equipment (UE) in a wireless communication system, the UE comprising:
   a transceiver configured to transmit and receive signals; and
   a processor operably connected to the transceiver, the processor configured to control the transceiver to:
     transmit, to a network-side entity, UE capability information indicating a high speed capability of the UE, and
     receive, from the network-side entity, configuration information associated with high speed of the UE,
   wherein the UE capability information includes power class information set to a specific value indicating that the UE is a high speed train (HST) roof-mounted UE type, and wherein the power class information indicates spherical coverage information including equivalent isotropic sensitivity (EIS) spherical coverage information corresponding to the HST roof-mounted UE type.

15. The UE of claim 14, wherein the UE capability information indicating the high speed capability of the UE comprises at least one of:
information indicating whether the UE supports high speed mobility;
information indicating a maximum moving speed supported by the UE; or
information indicating beam related support capability corresponding to the high speed capability of the UE.

16. The UE of claim 14, wherein the power class information indicates at least one of:
beam correspondence information corresponding to the high speed capability of the UE; or information indicating whether the UE supports high speed mobility.

17. The UE of claim 15, wherein the information indicating beam related support capability corresponding to the high speed capability of the UE comprises at least one of:
capability of receiving and measuring beams with different RX beam directions; or
capability of transmitting the beams with different TX beam directions.

18. The UE of claim 14, wherein the configuration information comprises at least one of:
limitation information corresponding to the high speed capability of the UE;
information for fixing a bore sight direction of an antenna panel of the UE corresponding to the high speed capability of the UE;
information for fixing an operating state of beam switching in a certain bore sight direction corresponding to the high speed capability of the UE;
radio resource management downlink beam measurement and detection reporting level information corresponding to the high speed capability of the UE; and
high speed operating mode information.

19. The UE of claim 14, wherein the processor is further configured to control the transceiver to:
receive, from the network-side entity, a message including information that request the high speed capability of the UE.

20. A network-side entity in a wireless communication system, the network-side entity comprising:
a transceiver configured to transmit and receive signals; and
a processor operably connected to the transceiver, the processor configured to control the transceiver to:
receive, from a user equipment (UE), UE capability information indicating a high speed capability of the UE, and
transmit, to the UE, configuration information associated with high speed of the UE,
wherein the UE capability information includes power class information set to a specific value indicating that the UE is a high speed train (HST) roof-mounted UE type, and
wherein the power class information indicates spherical coverage information including equivalent isotropic sensitivity (EIS) spherical coverage information corresponding to the HST roof-mounted UE type.

* * * * *